United States Patent
Kim et al.

(10) Patent No.: US 11,627,013 B2
(45) Date of Patent: Apr. 11, 2023

(54) DISPLAY APPARATUS, TERMINAL APPARATUS, AND METHODS OF CONTROLLING AT LEAST ONE PERIPHERAL DEVICE USING SAME

(71) Applicant: SAMSUNG ELECTRONICS CO., LTD., Suwon-si (KR)

(72) Inventors: Chang-won Kim, Asan-si (KR); Ga-hyun Joo, Suwon-si (KR); Jung-hyun Shim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/922,736

(22) Filed: Jul. 7, 2020

(65) Prior Publication Data

US 2020/0336325 A1 Oct. 22, 2020

Related U.S. Application Data

(63) Continuation of application No. 14/555,170, filed on Nov. 26, 2014, now abandoned.

(51) Int. Cl.
*H04L 12/28* (2006.01)
*H04N 21/41* (2011.01)
(Continued)

(52) U.S. Cl.
CPC ............ *H04L 12/282* (2013.01); *G05B 15/02* (2013.01); *G06F 3/048* (2013.01); *G06F 21/305* (2013.01);
(Continued)

(58) Field of Classification Search
CPC ............... H04L 12/282; H04L 12/2818; H04L 12/2834; H04L 12/4625; H04M 1/72415;
(Continued)

(56) References Cited

U.S. PATENT DOCUMENTS 6,163,270 A 12/2000 Silverman
6,563,430 B1 5/2003 Kemink et al.
(Continued)

FOREIGN PATENT DOCUMENTS

JP 2006-48174 A 2/2006
JP 2010097275 A 4/2010
(Continued)

OTHER PUBLICATIONS

Communication dated Jan. 29, 2021 by the Korean Intellectual Property Office in Korean Application No. 10-2019-0142838.
(Continued)

*Primary Examiner* — Nicholas R Taylor
*Assistant Examiner* — Tania M Pena-Santana
(74) *Attorney, Agent, or Firm* — Sughrue Mion, PLLC

(57) ABSTRACT

A display apparatus, a terminal apparatus, and controlling methods are provided. The display apparatus includes: a communicator to communicate with a terminal apparatus or a relay server in order to receive collected status information about at least one peripheral device from the terminal apparatus, a display unit to display a user interface (UI) screen; and a controller to generate a control UI for controlling the at least one peripheral device or a security UI for monitoring a peripheral space through the at least one peripheral device based on the status information about the at least one peripheral device and based on whether a communication with the terminal apparatus is possible, thereby controlling a home device t in real time according to a communication status with the terminal apparatus.

12 Claims, 17 Drawing Sheets

(51) Int. Cl.

| | | |
|---|---|---|
| *H04N 21/4223* | (2011.01) | |
| *H04N 21/414* | (2011.01) | |
| *H04N 21/4227* | (2011.01) | |
| *H04N 7/18* | (2006.01) | |
| *H04W 4/021* | (2018.01) | |
| *G06F 21/30* | (2013.01) | |
| *H04L 12/46* | (2006.01) | |
| *H04M 1/72415* | (2021.01) | |
| *G06F 3/048* | (2013.01) | |
| *G05B 15/02* | (2006.01) | |
| *H04N 21/475* | (2011.01) | |
| *H04N 21/4725* | (2011.01) | |
| *H04N 21/436* | (2011.01) | |
| *H04N 21/2187* | (2011.01) | |
| *G08B 3/10* | (2006.01) | |

(52) U.S. Cl.
CPC ...... *H04L 12/2818* (2013.01); *H04L 12/2834* (2013.01); *H04L 12/4625* (2013.01); *H04M 1/72415* (2021.01); *H04N 7/181* (2013.01); *H04N 21/4131* (2013.01); *H04N 21/41407* (2013.01); *H04N 21/4223* (2013.01); *H04N 21/4227* (2013.01); *H04W 4/021* (2013.01); *G05B 2219/2642* (2013.01); *G06F 2221/2101* (2013.01); *G06F 2221/2111* (2013.01); *G06F 2221/2141* (2013.01); *G08B 3/10* (2013.01); *G08C 2201/30* (2013.01); *G08C 2201/42* (2013.01); *G08C 2201/93* (2013.01); *H04N 21/2187* (2013.01); *H04N 21/43615* (2013.01); *H04N 21/4725* (2013.01); *H04N 21/4753* (2013.01)

(58) Field of Classification Search
CPC ........... H04N 21/4131; H04N 21/4223; H04N 21/41407; H04N 21/4227; H04N 7/181; H04N 21/4753; H04N 21/4725; H04N 21/43615; H04N 21/2187; H04W 4/021; G06F 21/305; G06F 3/048; G06F 2221/2101; G06F 2221/2111; G06F 2221/2141; G05B 15/02; G05B 2219/2642; G08B 3/10; G08C 2201/93; G08C 2201/42; G08C 2201/30
See application file for complete search history.

(56) References Cited

U.S. PATENT DOCUMENTS

| | | | |
|---|---|---|---|
| 8,195,203 B1 | 6/2012 | Tseng | |
| 8,577,392 B1 | 11/2013 | Pai et al. | |
| 8,843,245 B2 | 9/2014 | Choe et al. | |
| 2005/0166241 A1 | 7/2005 | Kim et al. | |
| 2005/0267605 A1 | 12/2005 | Lee et al. | |
| 2006/0022816 A1 | 2/2006 | Yukawa | |
| 2008/0064395 A1 | 3/2008 | Sibileau | |
| 2009/0177810 A1 | 7/2009 | Kweon et al. | |
| 2010/0312366 A1 | 12/2010 | Madonna et al. | |
| 2010/0317371 A1 | 12/2010 | Westerinen et al. | |
| 2011/0047214 A1 | 2/2011 | Lee et al. | |
| 2011/0102301 A1 | 5/2011 | Jeon et al. | |
| 2011/0106279 A1* | 5/2011 | Cho .................... | H04L 12/2818 700/90 |
| 2011/0136441 A1 | 6/2011 | Son et al. | |
| 2011/0205965 A1 | 8/2011 | Sprigg et al. | |
| 2011/0264305 A1 | 10/2011 | Choe et al. | |
| 2012/0084472 A1 | 4/2012 | Locascio et al. | |
| 2012/0284297 A1 | 11/2012 | Aguera-Arcas et al. | |
| 2012/0319825 A1 | 12/2012 | Shimy et al. | |
| 2012/0331109 A1 | 12/2012 | Baum et al. | |
| 2013/0005250 A1 | 1/2013 | Kim et al. | |
| 2013/0014219 A1 | 1/2013 | Kraus et al. | |
| 2013/0082827 A1 | 4/2013 | Cho et al. | |
| 2013/0114616 A1* | 5/2013 | Oh ....................... | H04L 12/2834 370/401 |
| 2014/0055251 A1* | 2/2014 | Son .................... | H04M 1/72415 340/12.54 |
| 2014/0087770 A1 | 3/2014 | Cho et al. | |
| 2014/0098247 A1 | 4/2014 | Rao et al. | |
| 2014/0167931 A1* | 6/2014 | Lee ......................... | G08C 17/02 340/12.5 |
| 2014/0173069 A1* | 6/2014 | Kim .................... | H04L 12/2809 709/221 |
| 2014/0223321 A1* | 8/2014 | Kwon ..................... | H04M 1/67 715/740 |
| 2014/0359454 A1* | 12/2014 | Lee ......................... | G06F 3/048 715/734 |
| 2015/0140990 A1* | 5/2015 | Kim ...................... | H04W 8/186 455/418 |
| 2015/0193114 A1 | 7/2015 | Jin | |
| 2016/0173318 A1* | 6/2016 | Ha .......................... | H04W 4/02 709/223 |
| 2016/0277204 A1* | 9/2016 | Kang .................. | H04L 12/2816 |
| 2016/0327921 A1 | 11/2016 | Ribbich et al. | |

FOREIGN PATENT DOCUMENTS

| | | |
|---|---|---|
| KR | 1020040036170 A | 4/2004 |
| KR | 10-2011-0047764 A | 5/2011 |
| KR | 10-2011-0119118 A | 11/2011 |
| KR | 10-2012-0065168 A | 6/2012 |
| WO | 2012148242 A2 | 11/2012 |

OTHER PUBLICATIONS

Communication dated Mar. 22, 2021 by the Korean Intellectual Property Office in Korean Application No. 10-2019-0142838.
Communication dated Feb. 11, 2021 by the European Patent Office in European Application No. 18 162 668.0.
Communication dated Mar. 16, 2015 by the European Patent Department in related Application No. 14194105.4.
Chueh, Ting-Fang et al., "Universal Remote Control on Smartphone", 2012 International Symposium on Computer, Consumer and Control, IEEE, Jun. 4, 2012, total 4 pages.
Communication dated May 31, 2016, issued by the European Patent Office in counterpart European Application No. 14194105.4.
David Szondy, "The Canary: A self-contained security device controlled by smartphone", Jul. 27, 2013, retrieved from the internet: URL:http://newatlas.com/canary-security/28422/, XP055333202. (3 pages total).
Communication dated Jan. 19, 2017 issued by the European Patent Office in counterpart European Patent Application No. 14194105.4.
Communication dated Sep. 29, 2017, from the European Patent Office in counterpart European Application No. 14194105.4.
Communication dated Feb. 8, 2018, issued by the Korean Intellectual Property Office in counterpart Korean Application No. 10-2013-0169113.
Communication dated Mar. 12, 2018, issued by the European Patent Office in counterpart European Application No. 14194105.4.
Communication dated Apr. 24, 2018, issued by the European Patent Office in counterpart European Application No. 14194105.4.
Communication dated Sep. 20, 2018 issued by the European Patent Office in Counterpart European Application No. 18162668.0.
Wang et al., "An IoT-based Appliance Control System for Smart Homes", 2013 Fourth International Conference on Intelligent Control and Information Processing (ICICIP), Jun. 2013, pp. 744-747, XP032441831.
Communication dated Mar. 27, 2019 issued by the Korean Intellectual Property Office in counterpart Korean Patent Application No. 10-2013-0169113.
Communication dated Apr. 8, 2019 issued by the European Patent Office in counterpart European Patent Application No. 18162668.0.
Communication dated Jul. 31, 2019 issued by the Korean Intellectual Property Office in counterpart Korean Patent Application No. 10-2013-0169113.

(56) References Cited

OTHER PUBLICATIONS

Communication dated Oct. 8, 2019 dated by the Korean Intellectual Property Office in counterpart Korean Patent Application No. 10-2013-0169113.
Communication dated Nov. 27, 2019 issued by the European Patent Office in counterpart European Application No. 18 162 668.0.
Communication dated Jan. 8, 2020, issued by the Korean Intellectual Property Office in counterpart Korean Application No. 10-2019-0142838.
Communication dated Nov. 12, 2021, issued by the European Patent Office in European Application No. 18162668.0.
Communication dated Jul. 6, 2020, issued by the European Patent Office in European Application No. 18162668.0.
Communication dated Jul. 29, 2020, issued by the Korean Intellectual Property Office in Korean Application No. 10-2019-0142838.
Communication dated Dec. 13, 2022, issued by the European Patent Office in European Application No. 22197560.0.

\* cited by examiner

FIG. 6
(a) 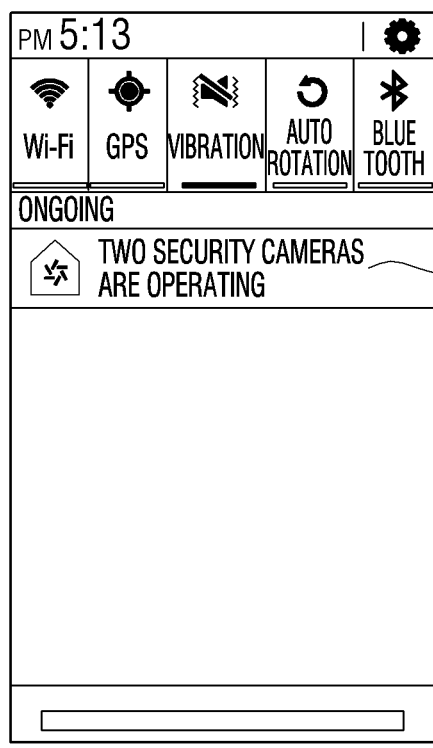 (b) 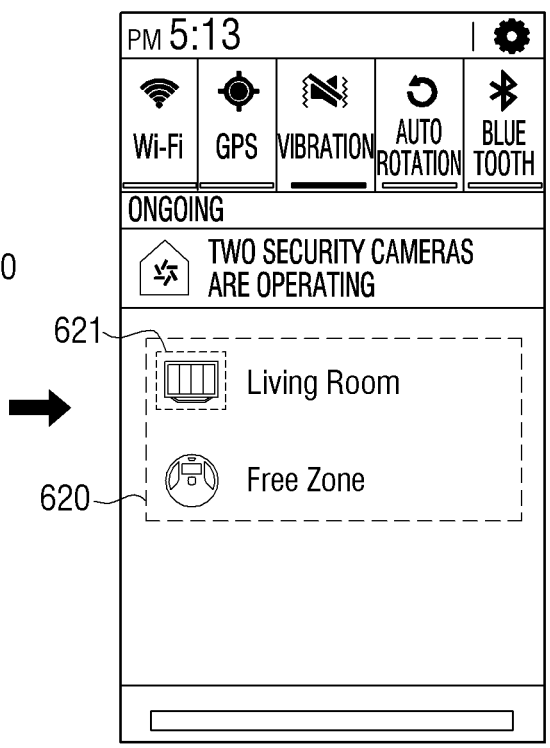

FIG. 7
(a)
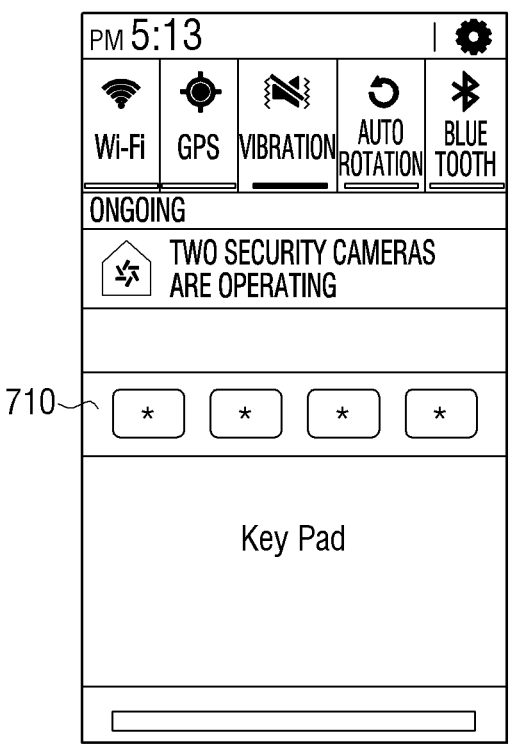
(b)
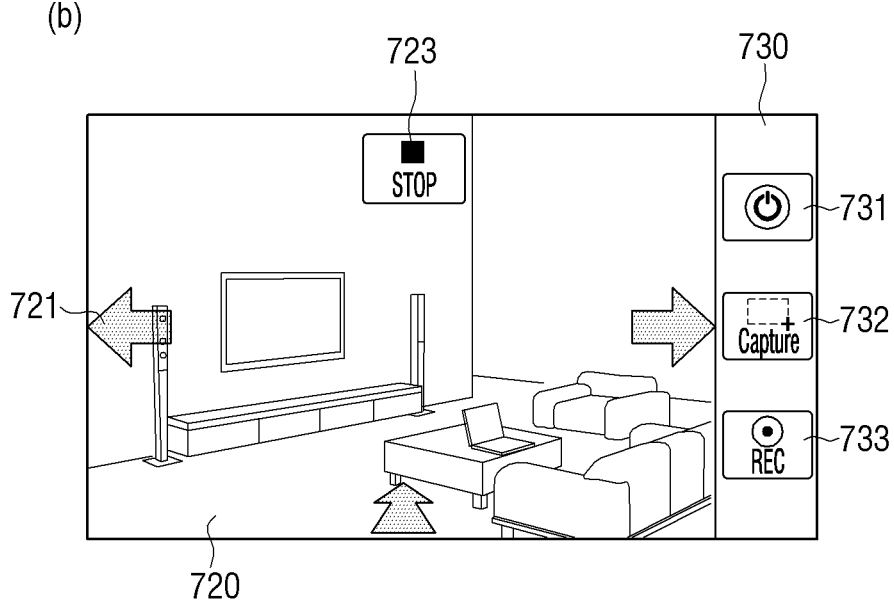

FIG. 8
(a)
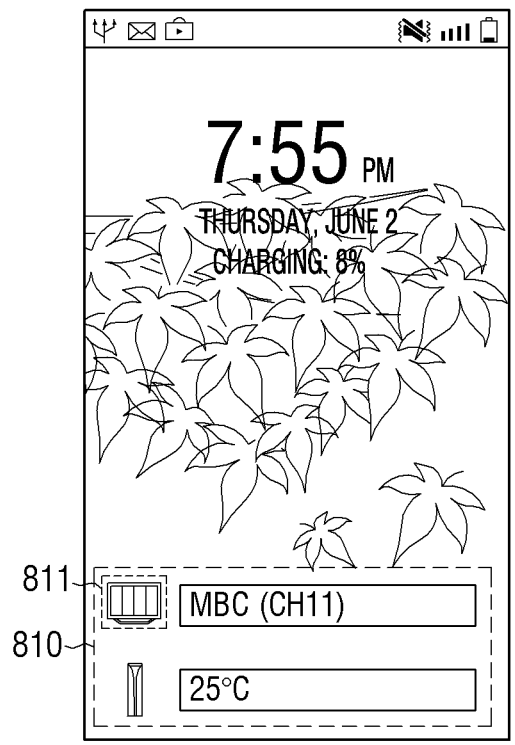
(b)
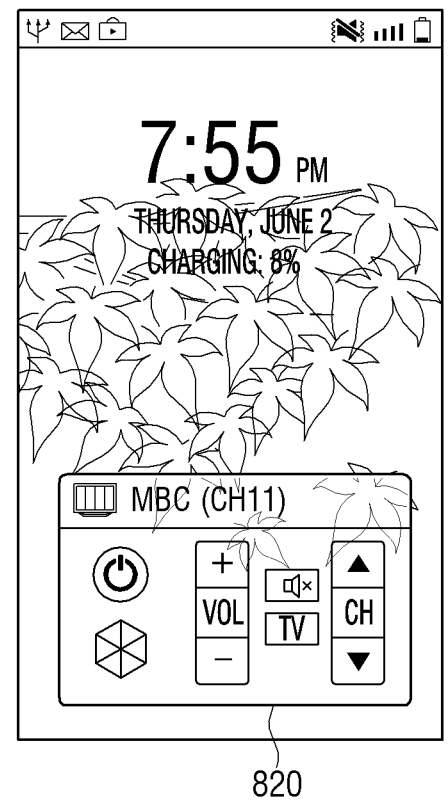

FIG. 9
(a)
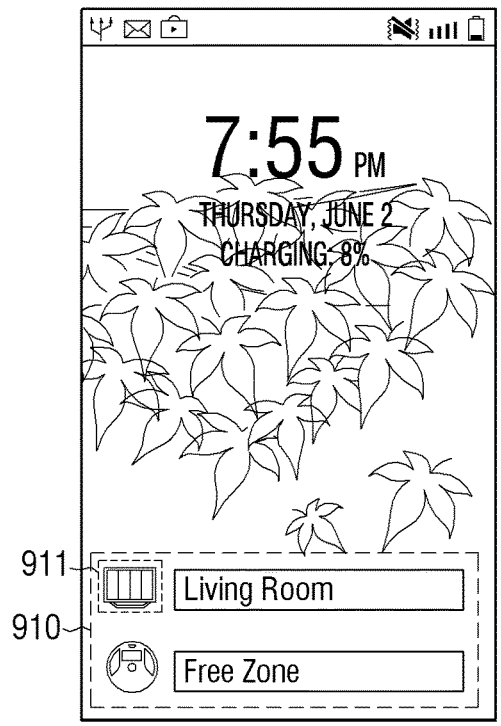
(b)
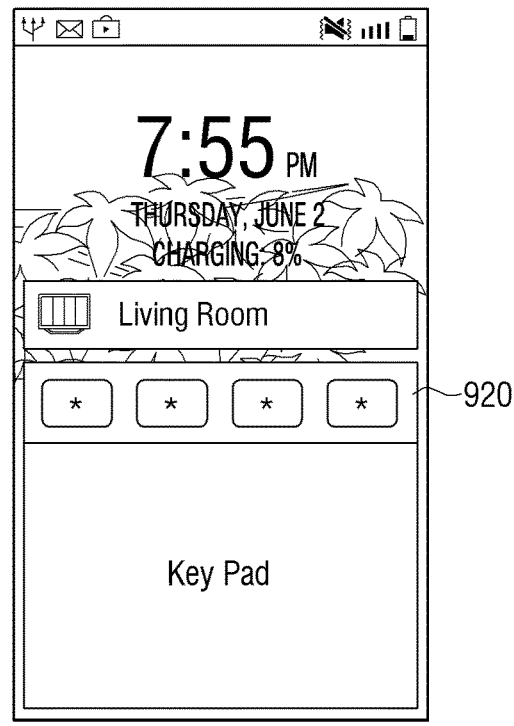
(c)
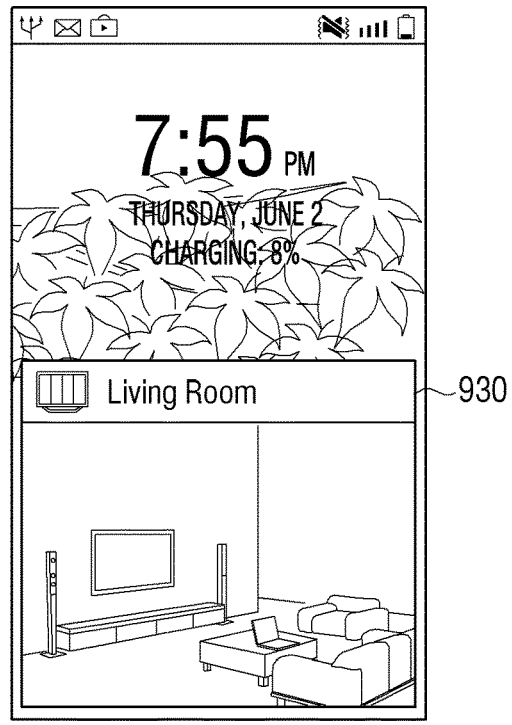

FIG. 11
(a)
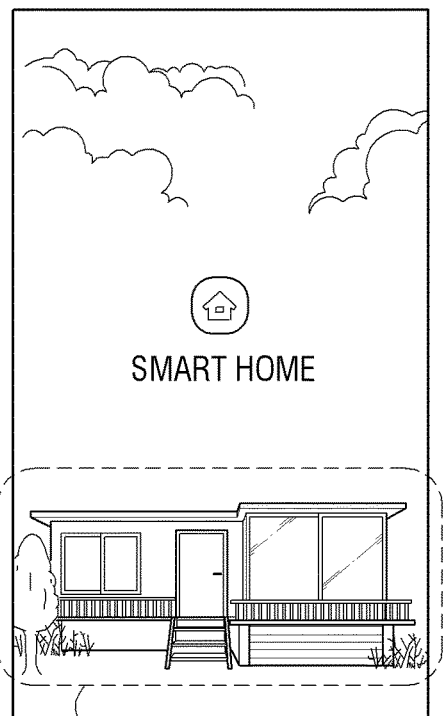
1110
(b)
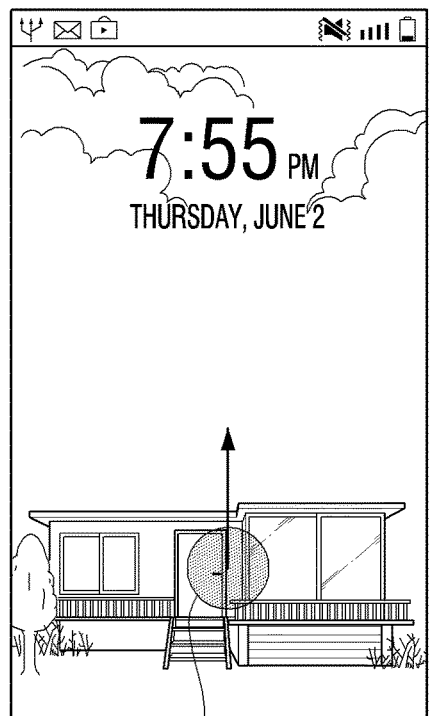
1120
(c)
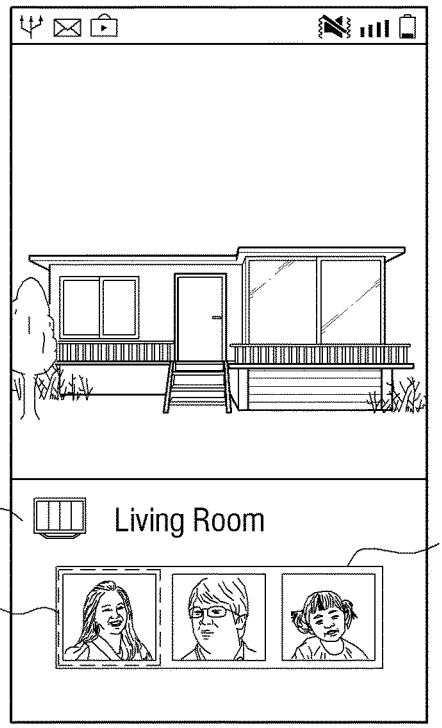
1130  1150  1140

DISPLAY APPARATUS, TERMINAL APPARATUS, AND METHODS OF CONTROLLING AT LEAST ONE PERIPHERAL DEVICE USING SAME

CROSS-REFERENCE TO RELATED APPLICATION(S)

This application is a Continuation of U.S. application Ser. No. 14/555,170 filed on Nov. 26, 2014, which claims priority from Korean Patent Application No. 10-2013-0169113, filed on Dec. 31, 2013, in the Korean Intellectual Property Office, the disclosure of which is incorporated herein by reference in its entirety.

BACKGROUND

1. Field

Apparatus and methods consistent with exemplary embodiments relate to providing a display apparatus, a terminal apparatus, and controlling methods thereof, and more particularly, to providing a display apparatus that provides a home network service, a terminal apparatus, and controlling methods thereof.

2. Description of the Related Art

The recent development of communication technologies, has led to an emergence of various technologies directed towards a home network system establishing, integrating and/or managing a network between home devices such as a smart TV, a smart air conditioner, etc. installed in a home. According to the various technologies, a user may integrate and manage the home devices by using a portable terminal apparatus such as a smartphone.

According to most technologies that have been commonly used, researched and/or developed, an operation status of a home device is monitored on a portable terminal apparatus through a data communication performed using relay terminal apparatuses that integrate and manage the portable terminal apparatus and the home device. The home device is controlled according to a user command input through the portable terminal apparatus.

Although home devices, such as a smart TV, a smart air conditioner, a robot cleaner, or the like, have various functions, these various functions of the home device have not been used via the above described and currently prevalent home network system.

Therefore, there is a need for methods of using various functions of a home device through a home network system.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

An aspect of the present disclosure provides using various functions of a home device through a home network system.

Another aspect of the present disclosure provides a home network service appropriate for a user according to a position of the user.

According to an aspect of an exemplary embodiment, a display apparatus includes a communicator configured to communicate with at least one of a terminal apparatus and a relay server to receive from the terminal apparatus collected status information corresponding to at least one peripheral device, a display unit configured to display a user interface (UI) screen, and a controller configured to generate at least one of a control UI for controlling the at least one peripheral device and a security UI for monitoring a peripheral space using the at least one peripheral device based on the status information corresponding to the at least one peripheral device and based on whether communication with the terminal apparatus is possible, and display the at least one of the control UI and the security UI on the display unit.

According to another exemplary embodiment, if communication with the terminal apparatus is possible, the controller generates a control list information about at least one controllable peripheral device, from among the at least one peripheral device, based on the received status information, and generates the control UI comprising a control menu corresponding to one of the at least one controllable peripheral device selected based on the control list information.

According to another exemplary embodiment, if communication with the terminal apparatus is not possible, the controller generates a security list information comprising identification information indicating the at least one peripheral device to be monitored and an area information depicting a monitoring area based on the received status information and setting information corresponding to each of the at least one peripheral device.

According to another exemplary embodiment, the controller further includes generate a user certification UI for certifying a user in response to one of the at least one peripheral device being selected based on the security list information, request the terminal apparatus, using the relay server, to monitor the selected one of the at least one peripheral device in response to an encryption key input on the user certification UI corresponding to preset encryption information, and generate a security UI for displaying image information that is captured by the selected peripheral device and received from the relay server, according to the monitoring request.

According to another exemplary embodiment, the security UI comprises a monitoring control menu for controlling a monitoring operation of the selected peripheral device.

According to another exemplary embodiment, the security UI further comprises an editing menu for editing an image captured by the selected peripheral device.

According to another exemplary embodiment, the controller generates the control list information based on an execution mode of the display apparatus, and the execution mode is at least one of a first execution mode activated on a quick menu, a second execution mode activated on a lock screen, and a third execution mode in which a home network service-related application is activated.

According to another exemplary embodiment, the controller generates a first control list information comprising the at least one controllable peripheral devices in the first execution mode and generates a second control list information comprising one activated controllable peripheral device from among the at least one controllable peripheral device in the second execution mode.

According to another exemplary embodiment, if in the third execution mode, the controller generates a control UI comprising status-related detailed information and a control menu of the at least one controllable peripheral device based on the received status information regardless of whether communication with the terminal apparatus is possible.

According to another exemplary embodiment, According to another aspect of an exemplary embodiment, a terminal apparatus includes a communicator configured to periodically communicate with at least one peripheral device, a storage unit configured to store status information about the at least one peripheral device, and a controller configured to, in response to a status information request message requesting status information of the at least one peripheral device being received from a display apparatus, control the communicator to transmit, to the display apparatus, at least one of status information about at least one controllable peripheral device, from among the at least one peripheral device, and the status information about the at least one peripheral device to be monitored based on the status information stored in the storage unit and based on whether a communication with the display apparatus is possible.

According to another exemplary embodiment, if communication with the display apparatus is possible, the controller transmits the status information about the at least one controllable peripheral device based on the status information stored in the storage unit and, in response to a control command being received from the display apparatus, transmits the control command to one of the at least one controllable peripheral device corresponding to the received control command.

According to another exemplary embodiment, if communication with the display apparatus is not possible, the controller transmits the status information about the at least one peripheral device to be monitored to the display apparatus through a relay server based on the status information stored in the storage unit and, in response to a monitoring performance command being received from the display apparatus through the relay server, transmits the monitoring performance command to one of the at least one peripheral device corresponding to the monitoring performance command, and transmits image information captured by the one of the at least one peripheral device to the display apparatus through the relay server according to the monitoring performance command.

According to another exemplary embodiment, According to another aspect of an exemplary embodiment, a method of controlling a display apparatus includes periodically communicating with a terminal apparatus or a relay server to receive collected status information about at least one peripheral device from the terminal apparatus, generating at least one of a control UI for controlling the at least one peripheral device and a security UI for monitoring a peripheral space through the at least one peripheral device based on the status information about the at least one peripheral device and based on whether a communication with the terminal apparatus is possible, and displaying the at least one of the control UI and the security UI.

According to another exemplary embodiment, the generating at least one of the control UI and the security UI includes, if communication with the terminal apparatus is possible, generating control list information about at least one controllable peripheral device, from among the at least one peripheral device, based on the status information, and in response to one of the at least one controllable peripheral device being selected based on the control list information, generating the control UI comprising a control menu corresponding to the selected controllable peripheral device.

According to another exemplary embodiment, the generating at least one of the control UI and the security UI includes, if communication with the terminal apparatus is not possible, generating security list information comprising identification information indicating the at least one peripheral device to be monitored and an area information depicting a monitoring area based on the status information and setting information corresponding to each of the at least one peripheral device.

According to another exemplary embodiment, the generating at least one of the control UI and the security UI further includes generating a user certification UI for certifying a user in response to one of the at least one peripheral device being selected based on the security list information, requesting, in response to an encryption key input on the user certification UI corresponding to preset encryption information, the terminal apparatus, using the relay server, to monitor the selected peripheral device, and generating, in response to image information being captured by the selected peripheral device and being received according to the monitoring request, the security UI for displaying the received image information.

According to another exemplary embodiment, the security UI further comprises a monitoring control menu for controlling a monitoring operation of the selected peripheral device.

According to another exemplary embodiment, the security UI further comprises an editing menu for editing an image captured by the selected peripheral device.

According to another exemplary embodiment, the control list information is generated based on an execution mode of the display apparatus, and the execution mode is at least one of a first execution mode activated on a quick menu, a second execution mode activated on a lock screen, and a third execution mode in which a home network service-related application is activated.

According to another exemplary embodiment, the generating of the control list information includes generating a first control list information comprising the at least one controllable peripheral device in the first execution mode, and generating a second control list information comprising one activated controllable peripheral device from among the at least one controllable peripheral device in the second execution mode.

According to another exemplary embodiment, the generating of the control UI includes if in the third execution mode, generating the control UI comprising status-related detailed information and a control menu of the at least one controllable peripheral device based on the received status information regardless of whether communication with the terminal apparatus is possible.

According to another aspect of an exemplary embodiment, a method of controlling a terminal apparatus includes periodically communicating with at least one peripheral device to receive status information about the at least one peripheral device, storing the received status information about the at least one peripheral device, receiving a status information request message requesting status information of the at least one peripheral device from a display apparatus, and transmitting at least one of status information about at least one controllable peripheral device, from among the at least one peripheral device, and the status information about the at least one peripheral device to be monitored, to the display apparatus based on the stored status information and based on whether the communication with the display apparatus is possible.

According to another exemplary embodiment, the transmitting of the status information includes if communication with the display apparatus is possible, transmitting the status information about the at least one controllable peripheral device to the display apparatus based on the stored status information, and in response to a control command being received from the display apparatus, transmitting the control command to one of the at least one controllable peripheral device corresponding to the received control command.

According to another exemplary embodiment, the transmitting of the status information includes if communication with the display apparatus is not possible, transmitting the status information about the at least one peripheral device to be monitored, to the display apparatus through a relay server based on the stored status information, in response to a monitoring performance command being received from the display apparatus through the relay server, transmitting the monitoring performance command to one of the at least one peripheral device corresponding to the monitoring performance command, and transmitting image information captured by the one of the at least one peripheral device to the display apparatus through the relay server according to the monitoring performance command.

According to another aspect of an exemplary embodiment, a method of controlling at least one peripheral device includes transmitting, to the at least one peripheral device, a request for status information of the at least one peripheral device, receiving, from the at least one peripheral device, the requested status information, generating at least one of a control user interface (UI) for controlling the at least one peripheral device and a security UI for monitoring a peripheral space using the at least one peripheral device based on the received status information and a communication status information, and transmitting, to the at least one peripheral device, a user command to control the at least one peripheral device, input by a user in the at least one of the control UI and the security UI.

BRIEF DESCRIPTION OF THE DRAWINGS

The above and/or other aspects will be more apparent and more readily appreciated by describing certain exemplary embodiments with reference to the accompanying drawings, in which:

FIG. 6 is views illustrating a method for displaying monitoring list information, about a peripheral device that is monitored, on a display apparatus, according to an exemplary embodiment;

FIG. 7 is views illustrating a method for displaying a security UI, for monitoring a peripheral space through a peripheral device, on a display apparatus, according to an exemplary embodiment;

FIG. 8 is views illustrating a method for displaying a control UI, for controlling a peripheral device, on a display apparatus, activated on a lock screen, according to an exemplary embodiment;

FIG. 9 is views illustrating a method for displaying a security UI, for monitoring a peripheral space through a peripheral device, on a display apparatus, activated on a lock screen, according to an exemplary embodiment;

FIG. 11 is views illustrating a method for monitoring a peripheral status through a peripheral device on a display apparatus, activated on a lock screen, according to another embodiment;

DETAILED DESCRIPTION OF THE EXEMPLARY EMBODIMENTS

Figure 1:
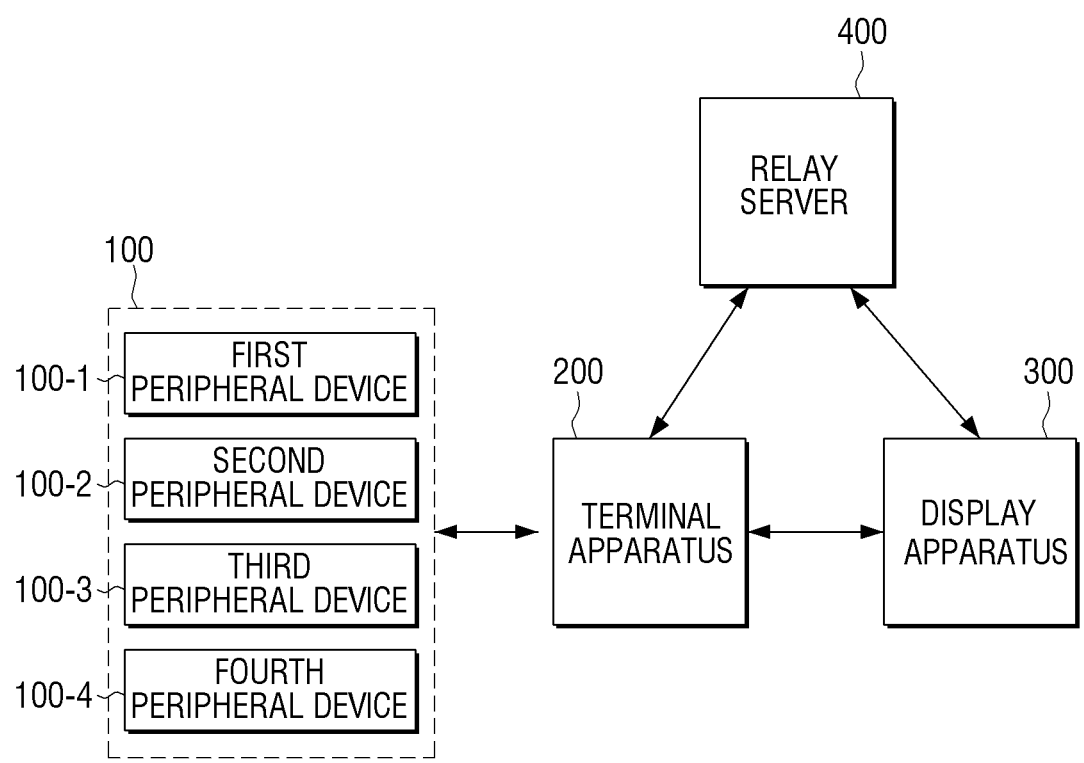
FIG. 1 is a block diagram of a home network system according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram of a home network system according to an exemplary embodiment.

Referring to FIG. 1, the home network system includes four peripheral devices 100-1 through 100-4, a terminal apparatus 200, a display apparatus 300, and a relay server 400.

The four peripheral devices 100-1 through 100-4 may be home devices installed in a home. According to an exemplary embodiment, the first peripheral device 100-1 may be a smart electronic device such as a robot cleaner, a washing machine, a smart TV, or a refrigerator, the second peripheral device 100-2 may be a security device such as an internet protocol (IP) camera, a door lock, a closed-circuit television (CCTV) camera, a fire detector, or the like, the third peripheral device 100-3 may be one of the various types of lighting equipment, and the fourth peripheral device 100-4 may be an energy device such as a boiler, an air conditioner, or the like. The four peripheral devices 100-1 through 100-4 may perform wired or wireless communications through the terminal apparatus 200 and may be controlled according to a control command from the display apparatus 300.

The terminal apparatus 200 may be a home gateway and communicate with the four peripheral devices 100-1 through 100-4 that are registered and the display apparatus 300 via wire or wirelessly. In detail, the terminal apparatus 200 may periodically perform data communication with the four peripheral devices 100-1 through 100-4 to store status information about the four peripheral devices 100-1 through 100-4. The status information may include activation information of the four peripheral devices 100-1 through 100-4, communication status information between the four peripheral devices 100-1 through 100-4 and the terminal apparatus 200, etc.

If a status information request message is received from the display apparatus 300, the terminal apparatus 200 transmits status information about a controllable peripheral device or status information about a peripheral device that may be monitored, to the display apparatus 300 based on the stored status information of the four peripheral devices 100-1 through 100-4 based on a communication status with the display apparatus 300. In detail, the terminal apparatus 200 may set one of the registered four peripheral devices 100-1 through 100-4 selected by a user as a peripheral device that may be monitored and may store the peripheral device. Thus, the terminal apparatus 200 may transmit status information about a controllable peripheral device or status information about a peripheral device that may be monitored, to the display apparatus 300 based on stored status information based on a communication status with the display apparatus 300. According to an exemplary embodiment, if a communication with the display apparatus 300 is possible, the terminal apparatus 200 may receive the status information request message from the display apparatus 300. In this case, the terminal apparatus 200 transmits status information about a controllable peripheral device from among the four peripheral devices 100-1 through 100-4 to the display apparatus 300 based on the stored status information. If the communication with the display apparatus 300 is impossible, the terminal apparatus 200 may receive the status information request message from the display apparatus 300 through the relay sever 400. In this case, the terminal apparatus 200 transmits status information about one of the four peripheral devices 100-1 through 100-4 that may be monitored, to the display apparatus 300 based on the stored status information and setting information.

If communication between the terminal apparatus 200 and the display apparatus is possible, the terminal apparatus 200 and the display apparatus 300 exist on the same network. Therefore, the communication between the terminal apparatus 200 and the display apparatus 300 may be directly performed through a short-range wireless communication. However, if communication between the terminal apparatus 200 and the display apparatus 300 is impossible, the terminal apparatus 200 and the display apparatus 300 exist on different networks. Therefore, the communication between the terminal apparatus 200 and the display apparatus 300 is possible through the relay server 400.

The display apparatus 300 may generate and display a control user interface (UI) for controlling at least one of the four peripheral devices 100-1 through 100-4 based on the status information received from the terminal apparatus 200 or may generate and display a security UI for monitoring at least one of the four peripheral devices 100-1 through 100-4.

In detail, if status information about a controllable peripheral device is received from the terminal apparatus 200, the display apparatus 300 may generate a control UI for controlling at least one of the four peripheral devices 100-1 through 100-4 based on the received status information. If status information about a peripheral device that may be monitored is received from the terminal apparatus 200, the display apparatus 300 may generate a security UI for monitoring a peripheral space through at least one of the four peripheral devices 100-1 through 100-4 based on the received status information.

However, if the status information request message is received from the display apparatus 300 regardless of a communication status with the display apparatus 300, the terminal apparatus 200 may transmit the stored status information about the four peripheral devices 100-1 through 100-4.

In this case, the display apparatus 300 may generate a control UI or a security UI according to the communication status with the terminal apparatus 200. In detail, if the display apparatus 300 directly communicates with the terminal apparatus 200 by wireless, the display apparatus 300 may generate a control UI for controlling at least one of the four peripheral devices 100-1 through 100-4 based on the status information received from the terminal apparatus 200. If the display apparatus 300 indirectly communicates with the terminal apparatus 200 through the relay server 400, the display apparatus 300 may generate a security UI for monitoring at least one of the four peripheral devices 100-1 through 100-4 based on the status information received from the terminal apparatus 200.

As described above, the display apparatus 300 of the home network system, according to the present exemplary embodiment, may generate a control UI for controlling at least one peripheral device installed in a home according to a communication status between the terminal apparatus 200 and the display apparatus 300 or may generate a security UI for monitoring a peripheral space through at least one peripheral device. Therefore, if a user of the display apparatus 300 stays in a home, the user may control an operation of a peripheral device through the display apparatus 300. If the user stays outside the home, the user may monitor a status of the home/display device through the display apparatus 300 in real time.

The above-described operation of the home network system will now be described in more detail with reference to FIGS. 2 and 3.

Figure 2:
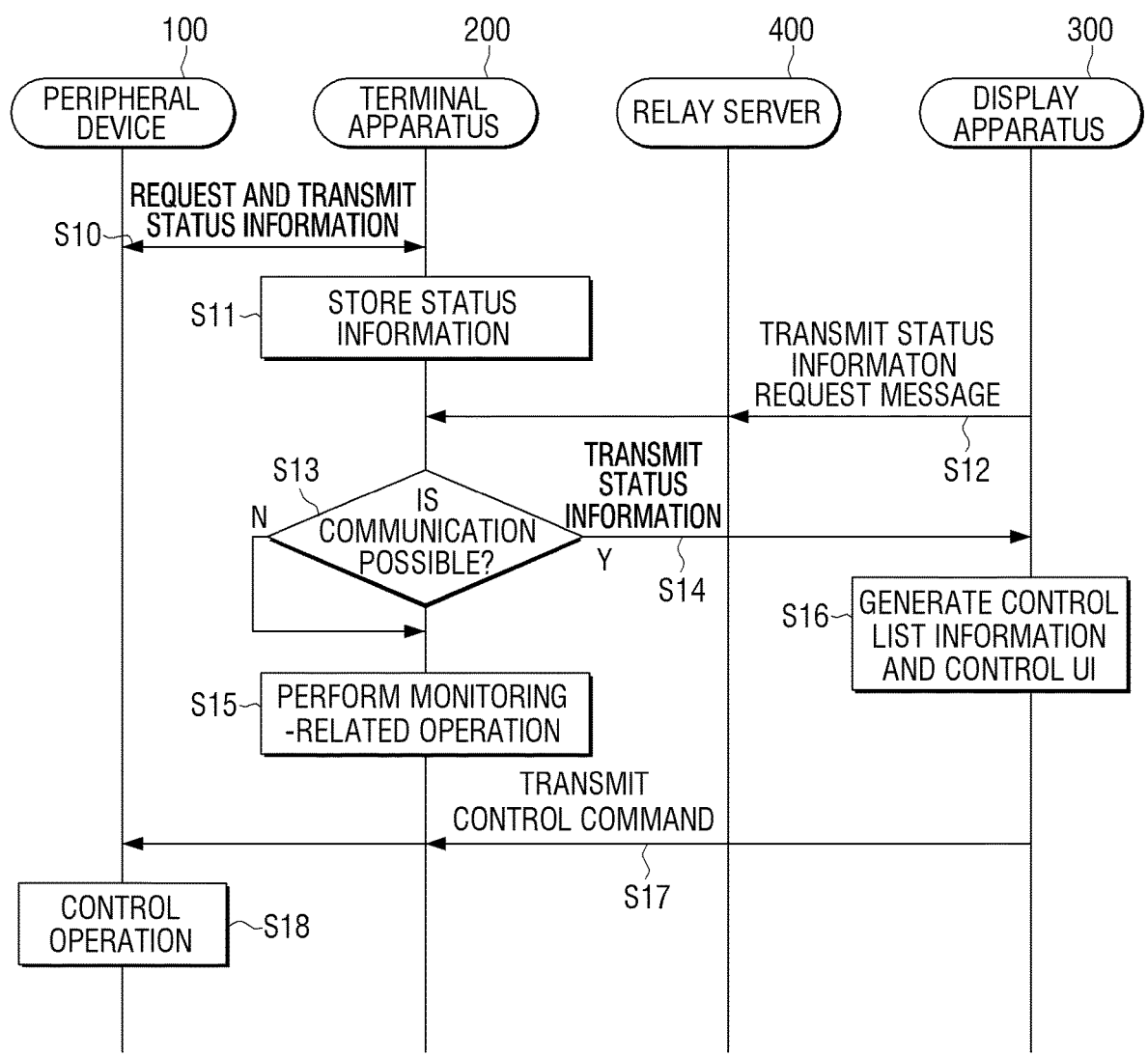
FIG. 2 is a flowchart of a method for controlling a peripheral device in a home network system, according to an exemplary embodiment.

FIG. 2 is a flowchart of a method for controlling a peripheral device in a home network system, according to an exemplary embodiment. FIG. 3 is a flowchart of a method for providing a security service by using a home device in the home network system, according to an exemplary embodiment.

Referring to FIG. 2, in operation S10, the terminal apparatus 200 periodically requests status information of at least one registered peripheral device 100. If the status information is received from the at least one peripheral device 100 according to the request, the terminal apparatus 200 parses and stores the status information in operation S11. Here, the status information may include at least one of activation information including at least one of on/off information, setting information, sensing information of the peripheral device 100 and communication status information between the peripheral device 100 and the terminal apparatus 200, according to an exemplary embodiment.

In operation S12, the display apparatus 300 generates a status information request message for requesting the status information about the at least one peripheral device 100 and transmits the status information request message to the terminal apparatus 200 according to a user command. If the status information request message is received, the terminal apparatus 200 determines whether a direct communication is possible with the display apparatus 200 that transmitted the status information request message, in operation S13. In detail, the terminal apparatus 200 may determine whether the display apparatus 300 exists on the same network using the received status information request message. If it is determined that the display apparatus 300 exists on the same network, the terminal apparatus 200 transmits status information about a controllable peripheral device, from among the stored status information, about the at least one peripheral device 100, to the display apparatus 300 in operation S14. If it is determined that the display apparatus does not exist on the same network, the terminal apparatus 200 performs a monitoring-related operation in operation S15. In other words, if it is determined that the display apparatus 300 does not exist on the same network, the terminal apparatus 200 transmits status information about a peripheral device that may be monitored, from among the stored status information, about the at least one peripheral device 100, to the display apparatus 300 through the relay server 400. The monitoring-related operation will be described later with reference to FIG. 3.

If the status information about the controllable peripheral device 100 is received from the terminal apparatus 200, the display apparatus 300 generates control list information and a control UI based on the received status information in operation S16. Here, the control list information may be a list information about the controllable at least one peripheral device 100, and the control UI may be a UI for controlling the peripheral device 100 selected from a plurality of peripheral devices 100 by the user. If the controllable peripheral devices 100 are the four peripheral devices 100-1 through 100-4 as in the above-described exemplary embodiment with reference to FIG. 1, the display apparatus 300 may generate and display control list information including device information about the four peripheral devices 100-1 through 100-4. If device information about the first peripheral device 100-1 is selected by the user in response to the control list information being displayed, the display apparatus 300 may generate and display a control UI including a control menu for controlling the selected first peripheral device 100-1, according to an exemplary embodiment.

If a user command is input when the control UI is displayed, the display apparatus 300 transmits a control command corresponding to the input user command to the terminal apparatus 200, and the terminal apparatus 200 transmits the control command to the peripheral device 100 selected by the user in operation S17. In operation S18, the peripheral device 100 that receives the control command from the terminal apparatus 200 performs a control operation based on the control command.

Figure 3:
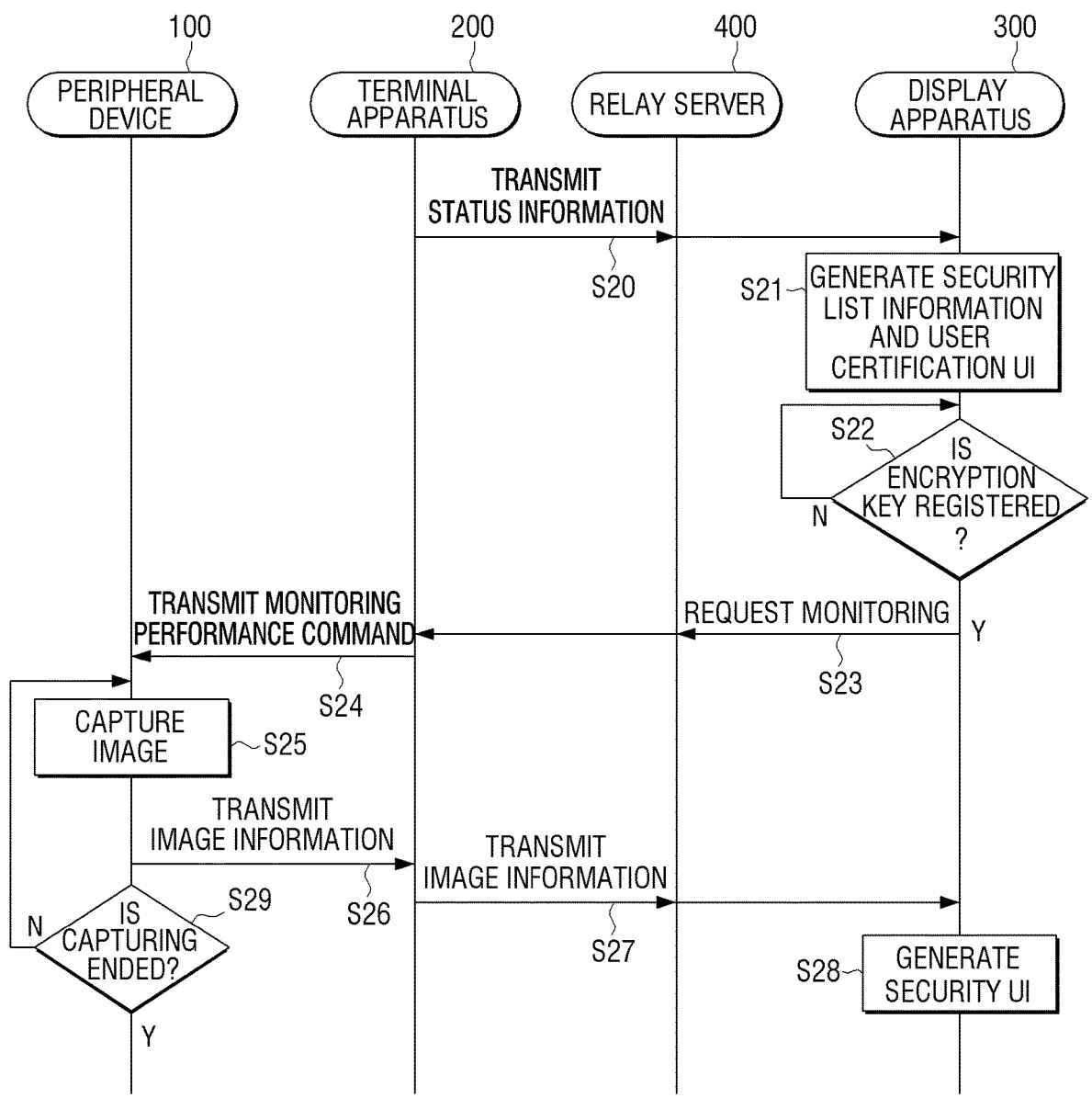
FIG. 3 is a flowchart of a method for providing a security service using a home device in a home network system, according to an exemplary embodiment.

If it is determined in operation S13 that the display apparatus 300 and the terminal apparatus 200 do not exist on the same network, the terminal apparatus 200 transmits status information about the peripheral device 100 that may be monitored, from among stored status information, about the at least one peripheral device 100, to the display apparatus 300 through the relay server 400 in operation S20 as shown in FIG. 3. If the status information is received, the display apparatus 300 generates and displays security list information and a user certification UI based on the received status information in operation S21. Here, the security list information may be list information about the peripheral device 100 that may monitor a peripheral space, from among a plurality of peripheral devices 100, according to an exemplary embodiment. For example, the first and second peripheral devices 100-1 and 100-2 of the four peripheral devices 100-1 through 100-4 may be peripheral devices that may be monitored. In this case, the display apparatus 300 generates and displays security list information including device information about the first and second peripheral devices 100-1 and 100-2 that may be monitored. If the first peripheral device 100-1 is selected by the user when the security list information is displayed, the display apparatus 300 generates and displays the user certification UI to determine whether the corresponding user is a registered user. If an encryption key is input by the user, the display apparatus 300 determines whether the encryption key input from the user corresponds to a preset encryption information to determine whether the corresponding user is a registered user in operation S22.

If it is determined that the corresponding user is a registered user through the user certification process, the display apparatus 300 requests the terminal apparatus 200 through the relay server 400 to monitor the peripheral device 100, previously selected by the user, in operation S23. If a monitoring request message is received, the terminal apparatus 200 transmits a monitoring performance command to the peripheral device 100 requested by the user based on the received monitoring request message in operation S24, and the peripheral device 100 that receives the monitoring performance command captures an image of a peripheral space based on the received monitoring performance command in operation S25. In operation S26, the peripheral device 100 transmits captured image information to the terminal apparatus 200, and in operation S27 the terminal apparatus 200 transmits the captured image information received from the peripheral device 100 to the display apparatus 300 through the relay server 400. If the captured image information is received, the display apparatus 300 generates a security UI and displays the captured image information through the generated security UI in operation S28. Here, the security UI may include an image captured by the peripheral device 100 and a monitoring control menu for controlling a monitoring operation of the corresponding peripheral device 100. The monitoring control menu may further include a first control menu for controlling an operation of the peripheral device 100 that captures the image and a second menu for editing and storing the image captured by the peripheral device 100. If a user command is input with respect to the first menu for controlling the operation of the peripheral device 100, the display apparatus 300 may transmit a control command corresponding to the input user command to the terminal apparatus 200 through the relay server 400, and the terminal apparatus 200 may transmit the corresponding control command to the peripheral device 100 that performs the monitoring-related operation. Therefore, the peripheral device 100 stops an image capturing operation or performs an operation of moving an image capturing direction or another operation based on the control command received from the terminal apparatus 200 in operation S29.

If the status information request message is received, the terminal apparatus 200 may not perform operation S13 as described above and may transmit stored status information about at least one peripheral device 100 to the display apparatus 300 directly or through the relay server 400. In this case, the display apparatus 300 may generate a control UI for controlling a controllable peripheral device 100 or a security UI for controlling the peripheral device 100 that may monitor a peripheral space, based on the status information of the at least one peripheral device 100, wherein the status information is transmitted from the terminal apparatus 200. In detail, if a direct communication with the terminal apparatus 200 is possible, the display apparatus 300 may generate control list information about the controllable peripheral device 100 based on the received status information. If the direct communication with the terminal apparatus 200 is impossible, the display apparatus 300 may generate security list information about the peripheral device 100 that may monitor the peripheral space, based on the received status information. The terminal apparatus 200 and the display apparatus 300 may generate a control UI for controlling the peripheral device 100 or a security UI for displaying image information captured by the peripheral device 100 according to the operations described with reference to FIGS. 2 and 3.

Structures of the terminal apparatus 200 and the display apparatus 300 will now be described in detail.

Figure 4:
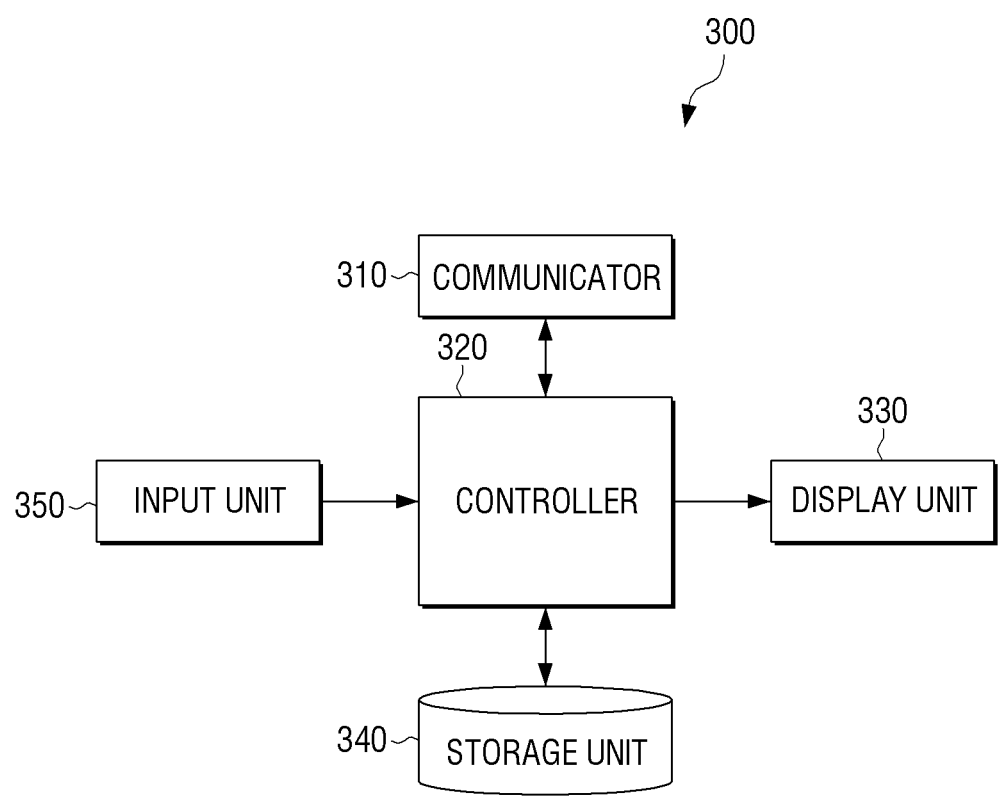
FIG. 4 is a block diagram of a display apparatus according to an exemplary embodiment.

FIG. 4 is a block diagram of the display apparatus 300, according to an exemplary embodiment.

Referring to FIG. 4, the display apparatus 300 may be a portable terminal apparatus that performs wireless communications like a smartphone, a tablet PC, or the like and may include a communicator 310, a controller 320, a display unit 330, a storage unit 340, and an input unit 350.

The communicator 310 wirelessly communicates with the terminal apparatus 200, or the relay server 400 which in-turn communicates with the terminal apparatus 200, that communicates with the at least one peripheral device 100 that is a home device installed in a home, to receive the collected status information about the at least one peripheral device 100 from the terminal apparatus 200. Here, the status information may include at least one of activation information including at least one of on/off information, setting information, sensing information of the peripheral device 100, and communication status information between the peripheral device 100 and the terminal apparatus 200, according to an exemplary embodiment.

The communicator 310 may be a wireless communication module and include at least one of a short-range communication module (not shown) and a wireless local area network (WLAN) module (not shown). Here, the short-range communication module is a communication module that performs a wireless short-range communication between the display apparatus 300 and the terminal apparatus 200 according to a control command of the controller 320. The short-range communication module may include at least one of a Wi-Fi module, a Bluetooth module, an infrared data association (IrDA) module, a near field communication (NFC) module, and a Zigbee module, according to an exemplary embodiment.

The WLAN module accesses the relay server 400 such as an access point (AP) (not shown) existing within a preset range to be connected to the Internet according to the control command of the controller 320. The WLAN module supports WLAN standard IEEE802.11x of Institute of Electrical and Electronic Engineers (IEEE).

The communicator 310 may further include at least one of a cellular communication module (not shown), a global positioning system (GPS) communication module (not shown), and a broadcast communication module (not shown). These communication modules are well-known technologies, and thus their detailed descriptions are omitted herein.

The controller 320 controls overall operations of the elements of the display apparatus 300. In particular, the controller 320 may generate a control UI for controlling at the least one peripheral device 100 based on status information of the at least one peripheral device 100 or may generate a security UI for monitoring a peripheral space through the at least one peripheral device 100 according to whether a communication with the terminal apparatus 200 is possible.

The display unit 330 displays the generated control UI or security UI on a screen according to the control command of the controller 320. The display unit 330 may be realized as a touch screen that senses a touch, according to an exemplary embodiment.

In detail, if the collected status information regarding the at least one peripheral device 100 is received from the terminal apparatus 200 through the communicator 310, the controller 320 determines a communication status with the terminal apparatus 200. According to an exemplary embodiment, if a communication with the terminal apparatus 200 is possible, the controller 320 generates control list information about a controllable peripheral device based on the received status information about the at least one peripheral device 100. Here, if the communication with the terminal apparatus 200 is possible, the display apparatus 300 may directly communicate with the terminal apparatus 200 through a short-range wireless communication. If a direct communication between the display apparatus 300 and the terminal apparatus 200 is possible as described above, the controller 320 generates the control list information regarding the controllable peripheral device based on the received status information about the at least one peripheral device 100 and displays the control list information through the display unit 330.

If a command to select the peripheral device 100 is input through the input unit 350 when the control list information is displayed on the screen through the display unit 330, the controller 320 generates a control UI including a control menu for controlling the peripheral device 100 corresponding to the input command. Therefore, the display unit 330 may display the control UI including the control menu corresponding to the peripheral device 100 selected by the user.

Here, the control list information may be list information including device information about the controllable at least one peripheral device 100. The input unit 350 receives a selection command according to various types of user controls of the user and transmits the selection command to the controller 320. The input unit 350 may include a touch input unit, such as a touch screen or a touch pad, and a key input unit, such as a key pad having various functional keys, numerical keys, character keys, etc.

Therefore, if a command to select the controllable peripheral device 100 is input through the input unit 350 when the control list information including the device information about the at least one peripheral device 100 is displayed, the controller 320 may generate a control UI including a control menu of the peripheral device 100 corresponding to the input command, from among control menus of peripheral devices 100 stored in the storage unit 340, and display the control UI through the display unit 330.

The controller 320 that generates the control UI for controlling the selected peripheral device 100 as described above may differently generate the control list information according to an execution mode of the display apparatus 300. Here, the execution mode may include at least one of a first execution mode activated on a quick menu, a second execution mode activated on a lock screen, and a third execution mode in which a home network service-related application is activated, according to an exemplary embodiment.

In detail, in the first execution mode activated on the quick menu, the controller 320 may generate and display first control list information including all controllable peripheral devices 100 based on the received status information. In the second execution mode activated on the lock screen, the controller 320 may generate and display second control list information including the peripheral device 100 that is activated among the all controllable peripheral devices 100. In the third execution mode in which the home network service-related application is activated, the controller 320 may generate and display a control UI including status-related detailed information and a control menu of at least one peripheral device 100 based on the received status information regardless of whether a communication with the terminal apparatus 200 is possible.

As described above, the controller 320 may differently generate control list information and a control UI according to an execution mode of the display apparatus 300 and display the control list information through the display unit 330. An operation of differently generating and displaying control list information and a control UI according to an execution mode will now be described in detail.

If it is determined that the communication with the terminal apparatus 200 is impossible, the controller 320 may generate security list information about the peripheral device 100 that may monitor a peripheral space, based on the received status information about the at least one peripheral device 100 and setting information of each peripheral device 100 registered in the storage unit 340 and display the security list information through the display unit 330. Here, if the communication with the terminal apparatus 200 is impossible, the display apparatus 300 and the terminal apparatus 200 may communicate with each other through the relay server 400. The security list information may include identification information indicating the peripheral device 100 that may monitor the peripheral space and area information showing an area that may be monitored through the corresponding peripheral device 100.

If the display apparatus 300 and the terminal apparatus 200 indirectly communicate with each other through the relay server 400 as described above, the controller 320 may generate security list information including identification information and area information of the peripheral device 100 that may be monitored, based on received status information and registered setting information of at least one peripheral device and display the security list information through the display unit 330.

If a command to select the peripheral device 100, that may monitor a peripheral space, is input through the input unit 350 when the security list information is displayed, the controller 320 may generate a user certification UI for certifying the user and display the user certification UI through the display unit 330. If an encryption key is input through the input unit 350 when the user certification UI is displayed, the controller 320 determines whether the input encryption key corresponds to a preset encryption information. If it is determined that the encryption key corresponds to the preset encryption information, the controller 320 requests the terminal apparatus 200, via the relay server 400, to monitor the peripheral device 100 corresponding to the input selection command. Therefore, the terminal apparatus 200 transmits a monitoring performance command to the peripheral device 100 that is requested to be monitored and, if image information of a peripheral space captured by the corresponding peripheral device 100 is received from the peripheral device 100, transmits the received image information to the display apparatus 300 through the relay server 400.

If the image information is received, the controller 320 generates a security UI for displaying an image captured by the peripheral device 100, that is requested to be monitored. The controller 320 controls the display unit 330 to display the image corresponding to the received image information through the generated security UI. Therefore, the display unit 330 may display the image captured by the peripheral device 100, that is requested to be monitored, in an area of the security UI. Therefore, the user may monitor a peripheral space, which is related to the peripheral device 100 selected by the user, in real time through the image displayed in the area of the security UI displayed on the screen of the display apparatus 300.

According to an exemplary embodiment, the controller 320 may generate a security UI including a monitoring control menu for controlling a monitoring operation of the peripheral device 100 that is requested to be monitored. Also, the controller 320 may generate a security UI further including an editing menu for editing the image captured by the peripheral device 100, that is requested to be monitored. Here, the monitoring control menu may include at least one of a menu for switching on and/or off the peripheral device 100 that is monitored, and a menu for controlling a monitoring direction of the corresponding peripheral device 100, according to an exemplary embodiment. The controlling menu is not limited thereto and may contain several other menus. The editing menu may include at least one of a menu for capturing or recording the image captured by the peripheral device 100, that is requested to be monitored, and a menu for ending a currently displayed security UI, according to an exemplary embodiment.

Therefore, the user may control an operation of the peripheral device 100 that is monitored or may edit the image captured by the corresponding peripheral device 100 using the monitoring control menu or the editing menu included in the security UI displayed on the screen of the display apparatus 300.

An operation of controlling at least one peripheral device 100 or providing a security service through the at least one peripheral device 100 in the display apparatus 300 will now be described in more detail.

Figure 5:
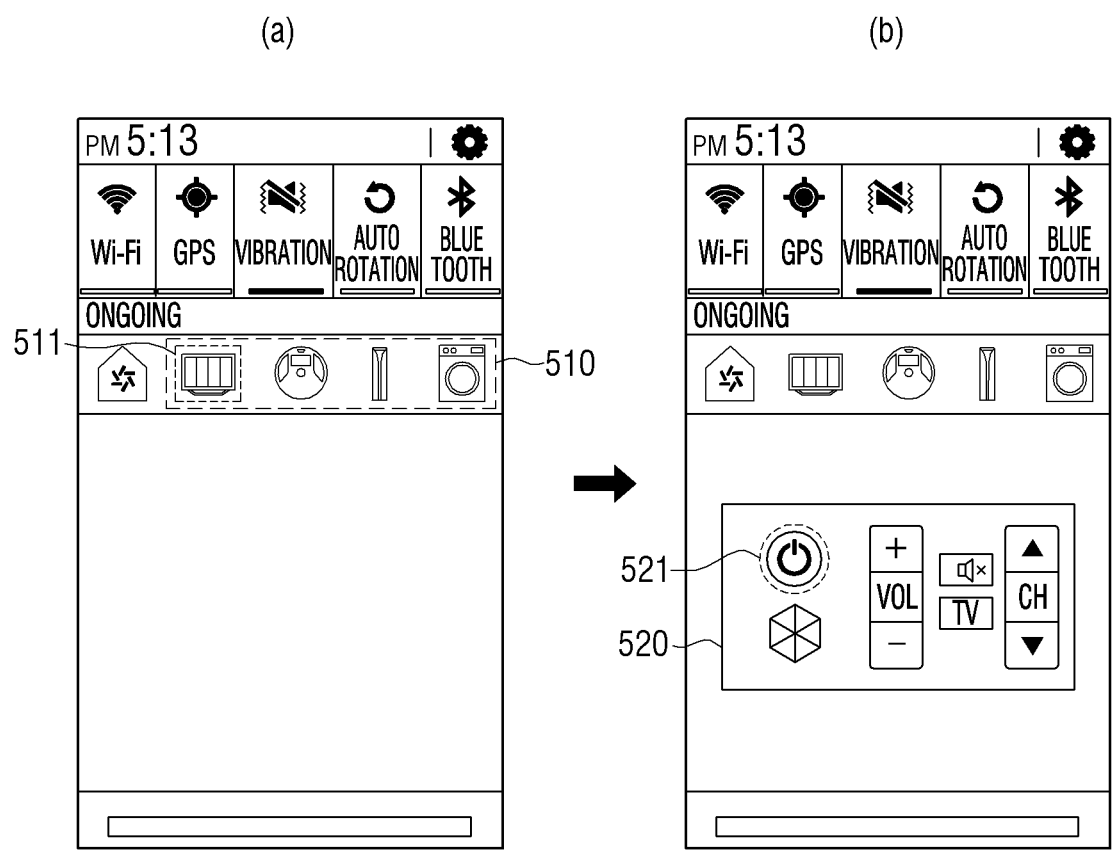
FIG. 5 is views illustrating a method for displaying a control user interface (UI), for controlling a peripheral device, on a display apparatus, according to an exemplary embodiment.

FIGS. 5A and 5B are views illustrating a method for displaying a control UI for controlling a peripheral device in a display apparatus, according to an exemplary embodiment.

The display apparatus 300 may directly perform a data communication with the terminal apparatus 200 through a short-range wireless communication to receive status information about at least one peripheral device 100 from the terminal apparatus 200. If the status information is received, the display apparatus 300 generates and displays control list information about a controllable peripheral device 100 according to an execution mode of the display apparatus 300.

In detail, as shown in FIG. 5A, if the execution mode of the display apparatus 300 is a first execution mode activated on a quick menu, the display apparatus 300 may generate and display first control list information 510 about all controllable peripheral devices 100 based on status information received from the terminal apparatus 200.

For example, the display apparatus 300 may receive status information about a smart TV, a robot cleaner, an air conditioner, and a smart washing machine belonging to the first peripheral device 100-1 from the terminal apparatus 200. The display apparatus 300 may also store setting information for setting devices belonging to the four peripheral devices 100-1 through 100-4. The setting information may include control menus of the devices belonging to the four peripheral devices 100-1 through 100-4.

In this case, the display apparatus 300 may generate and display the first control list information 510 including identification icons indicating the smart TV, the robot cleaner, the air conditioner, and the smart washing machine belonging to the first peripheral device 100-1 related to the received status information, from among the devices belonging to the four peripheral devices 100-1 through 100-4, based on the received status information and stored setting information. If an identification icon 511, indicating the smart TV according to an exemplary embodiment, is selected according to a request of the user when the first control list information 510 is displayed, the display apparatus 300 may generate and display a control UI 520 including a control menu corresponding to the smart TV, based on a control menu included in the stored setting information, as shown in FIG. 5B.

As shown in FIG. 5B, the control UI 520 for controlling the smart TV corresponding to the selected identification icon 511 may include a control menu for controlling a channel and a volume of the smart TV, a control menu for switching on and/or off the smart TV, etc. If the control menu for switching on and/or off the smart TV 521 is selected according to a user request when the control UI 520 including the control menu is displayed, the display apparatus 300 transmits a control command corresponding to the selected control menu to the terminal apparatus 200. Therefore, the terminal apparatus 200 may transmit the control command to the smart TV based on the control command received from the display apparatus 300, and the smart TV may be switched on and/or off according to the received control command.

FIGS. 6A and 6B are views illustrating a method for displaying monitoring list information about a peripheral device that may be monitored, in a display apparatus, according to an exemplary embodiment.

The display apparatus 300 may indirectly perform a data communication with the terminal apparatus 200 through the relay server 400 to receive collected status information about at least one peripheral device 100 from the terminal apparatus 200. If the status information is received, the display apparatus 300 generates and displays monitoring list information about the peripheral device 100 that may be monitored, according to an execution mode of the display apparatus 300.

In detail, as shown in FIG. 6A, if the execution mode of the display apparatus 300 is a first execution mode activated on a quick menu, the display apparatus 300 may generate and display monitoring list information 610 about the peripheral device 100 that may be monitored, based on status information and registered setting information received from the terminal apparatus 200.

For example, the display apparatus 300 may receive status information about a smart TV, a robot cleaner, an air conditioner, and a smart washing machine belonging to the first peripheral device 100-1 through the relay server 400. The display apparatus 300 may store setting information for setting the smart TV and the robot cleaner belonging to the first peripheral device 100-1 of the four peripheral devices 100-1 through 100-4 and setting information for a security device belonging to the second peripheral device 100-2 to devices that may be monitored. The setting information for a security device may include identification information indicating a device that may be monitored and area information showing an area of each device that may be monitored.

In this case, the display apparatus 300 displays a notification message 610 notifying the number of devices that may be monitored among the smart TV, the robot cleaner, the air conditioner, and the smart washing machine belonging to the first peripheral device 100-1 related to the received status information, based on the received status information and the stored setting information. If the notification message 610 is selected according to a user command, the display apparatus 300 generates and displays monitoring list information 620 including the identification information and the area information corresponding to the device that may be monitored.

If devices that may be monitored are the smart TV and the robot cleaner as in the above-described exemplary embodiment, the display apparatus 300 may generate and display the monitoring list information 620 including identification information (an identification icon) and area information indicating the smart TV and identification information (an identification icon) and area information indicating the robot cleaner as shown in FIG. 6B.

If an identification icon 621 indicating the smart TV is selected according to a request of the user when the monitoring list information 620 is displayed, the display apparatus 300 may perform a user certification and display an image captured by the smart TV through a security UI as shown in FIGS. 7A and 7B.

FIGS. 7A and 7B are views illustrating a method for displaying a security UI for monitoring a peripheral space through a peripheral device in a display apparatus, according to an exemplary embodiment.

If the identification icon 621 indicating the smart TV is selected as described with reference to FIGS. 6A and 6B, the display apparatus 300 generates and displays a user certification UI 710 for certifying a user as shown in FIG. 7A. If an encryption key is input by the user when the user certification UI 710 is displayed, the display apparatus 300 determines whether the input encryption key corresponds to a preset encryption information. If it is determined that the input encryption key corresponds to the preset encryption information, the display apparatus 300 transmits a monitoring performance command for performing a monitoring-related operation to monitor the smart TV to the terminal apparatus 200 through the relay server 400. Therefore, the terminal apparatus 200 transmits the monitoring performance command to the security device to monitor the smart TV based on the received monitoring performance command. Therefore, the security device captures an image of a peripheral space according to the monitoring performance command received from the terminal apparatus 200 and transmits captured image information to the terminal apparatus 200. The terminal apparatus 200 transmits the image information received from the security device to the display apparatus 300 through the relay server 400. If the image information captured by the security device is received from the terminal apparatus 200 through the relay server 400, the display apparatus 300 may generate a security UI and display the image captured by the smart TV through the generated security UI as shown in FIG. 7B.

Here, as shown in FIG. 7B, the display apparatus 300 may display a monitoring control menu for controlling a monitoring operation of monitoring the smart TV in an area 720 of a security UI in which the image captured by the security device is displayed. The display apparatus 300 may display a security UI including an editing menu for editing the image captured by the smart TV in an area 730.

In detail, the display apparatus 300 may display a monitoring control menu in the area 720 of the security UI in which the image captured by the security device is displayed. Here, the monitoring control menu includes a direction menu 721 for changing a capturing area captured by the security device and a control menu 723 for stopping the security UI. The display apparatus 300 may include a power menu 731 for controlling an operation of switching on and/or off the security device, a capture menu 733 for capturing the image displayed in the area 720 of the security UI, and a recording menu 735 for recording the corresponding image in the area 720 of the security UI.

For example, if the user selects a direction menu for moving a capturing direction into a left direction, the display apparatus 300 transmits a control command corresponding to the selected direction menu to the terminal apparatus 200 through the relay server 400, and the terminal apparatus 200 transmits the control command to the security device. Therefore, the security device moves the capturing direction into the left direction based on the received control command to capture a peripheral space in the moved direction and transmit captured image information to the terminal apparatus 200. Thereafter, the terminal apparatus 200 may transmit the image information captured by the security device to the display apparatus 300 through the relay server 400, and the display apparatus 300 may display the image that the security device moves into the left direction to capture, in the area 720 of the security UI.

If an identification icon of a robot cleaner, in which area information "Free Zone" is set, is selected as shown in FIG. 6B, the display apparatus 300 may display an image captured by the robot cleaner through the above-described operation in the area 720 of the security UI. Here, if a direction menu displayed in the area 720 of the security UI is selected by the user, the display apparatus 300 transmits a control command corresponding to the selected direction menu to the terminal apparatus 200 through the relay server 400, and the terminal apparatus 200 transmits the control command to the robot cleaner. Therefore, the robot cleaner may move into a direction corresponding to the selected direction menu to capture an image, and the display apparatus 300 may display the image that the robot cleaner moves into the direction corresponding to the selected direction menu to capture, in the area 720 of the security UI.

As described above, the display apparatus 300 may control a movement of the peripheral device 100 that may be monitored, in a camera capturing direction and remotely move the corresponding peripheral device 100 to capture an image. Therefore, the user may monitor all areas of a home through the display apparatus 300 in real time to check whether risk elements are detected.

FIGS. 8A and 8B are views illustrating a method for displaying a control UI for controlling a peripheral device in a display apparatus activated on a lock screen, according to an exemplary embodiment.

The display apparatus 300 may directly perform a data communication with the terminal apparatus 200 through a short-range wireless communication to receive status information about at least one peripheral device 100 from the terminal apparatus 200. If the status information is received, the display apparatus 300 generates and displays control list information about a controllable peripheral device 100 according to an execution mode of the display apparatus 300.

In detail, if the execution mode of the display apparatus 300 is a second execution mode activated on a lock screen as shown in FIG. 8A, the display apparatus 300 may generate and display second control list information 810 about one of the activated controllable peripheral devices 100 based on the status information received from the terminal apparatus 200.

For example, the display apparatus 300 may receive status information about a smart TV, a robot cleaner, an air conditioner, and a smart washing machine belonging to the first peripheral device 100-1 from the terminal apparatus 200. The display apparatus 300 may also store setting information for setting devices belonging to the four peripheral devices 100-1 through 100-4. The setting information may include a control menu of the devices belonging to the four peripheral devices 100-1 through 100-4.

In this case, the display apparatus 300 classifies the smart TV, the robot cleaner, the air conditioner, and the smart washing machine belonging to the first peripheral device 100-1, from among the devices belonging to the four peripheral devices 100-1 through 100-4, as controllable peripheral devices 100 based on the received status information and the stored setting information. If the controllable peripheral devices 100 are classified, the display apparatus 300 may classify only devices, which operate in an activation mode, from among the smart TV, the robot cleaner, the air conditioner, and the smart washing machine belonging to the first peripheral device 100-1, as the controllable peripheral devices 100, based on activation information included in the receives status information.

The devices that operate in the activation mode may be in a mode in which the devices currently operate. For example, if the smart TV and the air conditioner operate, from among the smart TV, the robot cleaner, the air conditioner, and the smart washing machine, the display apparatus 300 may generate and display second control list information 810 including identification icons indicating the smart TV and the air conditioner and activation information included in status information of the smart TV and the air conditioner.

Therefore, the second control list information 810 may include activation information including the identification icon and current channel information of the smart TV and activation information including the identification icon of the air conditioner and a current room temperature sensed by the air conditioner, according to an exemplary embodiment.

If an identification icon 811 indicating the smart TV is selected by the user when the second control list information 810 is displayed, the display apparatus 300 may generate and display a control UI 820 including a control menu corresponding to the smart TV, based on a control menu included in stored setting information, as shown in FIG. 8B.

Therefore, the user may remotely control the smart TV through the control menu included in the control UI 820.

FIGS. 9A through 9C are views illustrating a method for displaying a security UI for monitoring a peripheral space through a peripheral device in a display apparatus activated on a lock screen, according to an exemplary embodiment.

As shown in FIG. 9A, the display apparatus 300 may indirectly perform a data communication with the terminal apparatus 200, through the relay server 400, to receive collected status information about at least one peripheral device 100 from the terminal apparatus 200. If the status information is received, the display apparatus 300 may generate and display monitoring list information about the peripheral device 100 that may be monitored, according to an execution mode of the display apparatus 300.

In detail, as shown in FIG. 9A, if the execution mode of the display apparatus 300 is a second execution mode activated on a lock screen, the display apparatus 300 may generate and display monitoring list information 910 about the peripheral device 100 that may be monitored, based on the status information and the stored setting information received from the terminal apparatus 200.

For example, the display apparatus 300 may receive status information about a smart TV, a robot cleaner, an air conditioner, and a smart washing machine belonging to the first peripheral device 100-1 through the relay server 400. The display apparatus 300 may also store setting information for setting the smart TV and the robot cleaner belonging to the first peripheral device 100-1 and store setting information for setting a security device belonging to the second peripheral device 100-2 from among devices belonging to the four peripheral devices 100-1 through 100-4. Also, the setting information may include identification information indicating a peripheral device that may be monitored and area information showing an area that may be monitored by each device.

In this case, the display apparatus 300 generates and displays monitoring list information 910 about a device that may be monitored, from among the smart TV, the robot cleaner, the air conditioner, and the smart washing machine belonging to the first peripheral device 100-1, based on the received status information and the stored setting information. Here, the monitoring list information 910 may include identification icons identifying the smart TV and the robot cleaner and area information showing an area that may be monitored through the selection of the smart TV and the robot cleaner.

If an identification icon 911 indicating the smart TV is selected by the user when the monitoring list information 910 is displayed, the display apparatus 300 generates and displays a user certification UI 920 for performing a user certification as shown in FIG. 9B.

If an encryption key is input from the user when the user certification UI 920 is displayed, the display apparatus 300 determines whether the input encryption key corresponds to a preset encryption information. If the input encryption key corresponds to the preset encryption information, the display apparatus 300 determines that the user certification is completed, and generates and displays a security UI 930 for displaying an image captured by the security device covering the living room/smart TV selected by the user as shown in FIG. 9C.

In detail, if the user certification is completed, the display apparatus 300 transmits a monitoring performance command to the terminal apparatus 200 through the relay server 400. Here, the monitoring performance command is to perform a monitoring-related operation through the security device covering the living room/smart TV. Therefore, the terminal apparatus 200 transmits the monitoring performance command to the security device covering the living room/smart TV based on the received monitoring performance command. Therefore, the security device covering the living room/smart TV captures an image of a peripheral space and transmits the captured image information to the terminal apparatus 200 according to the monitoring performance command received from the terminal apparatus 200. Thereafter, the terminal apparatus 200 transmits the image information transmitted from the security device covering the living room/smart TV to the display apparatus 300 through the relay server 400. If the image information captured by the security device covering the living room/smart TV is received from the terminal apparatus 200 through the relay server 400, the display apparatus 300 may generate a security UI 930 and display the image captured by the security device covering the living room/smart TV through the generated security UI 930.

Figure 10:
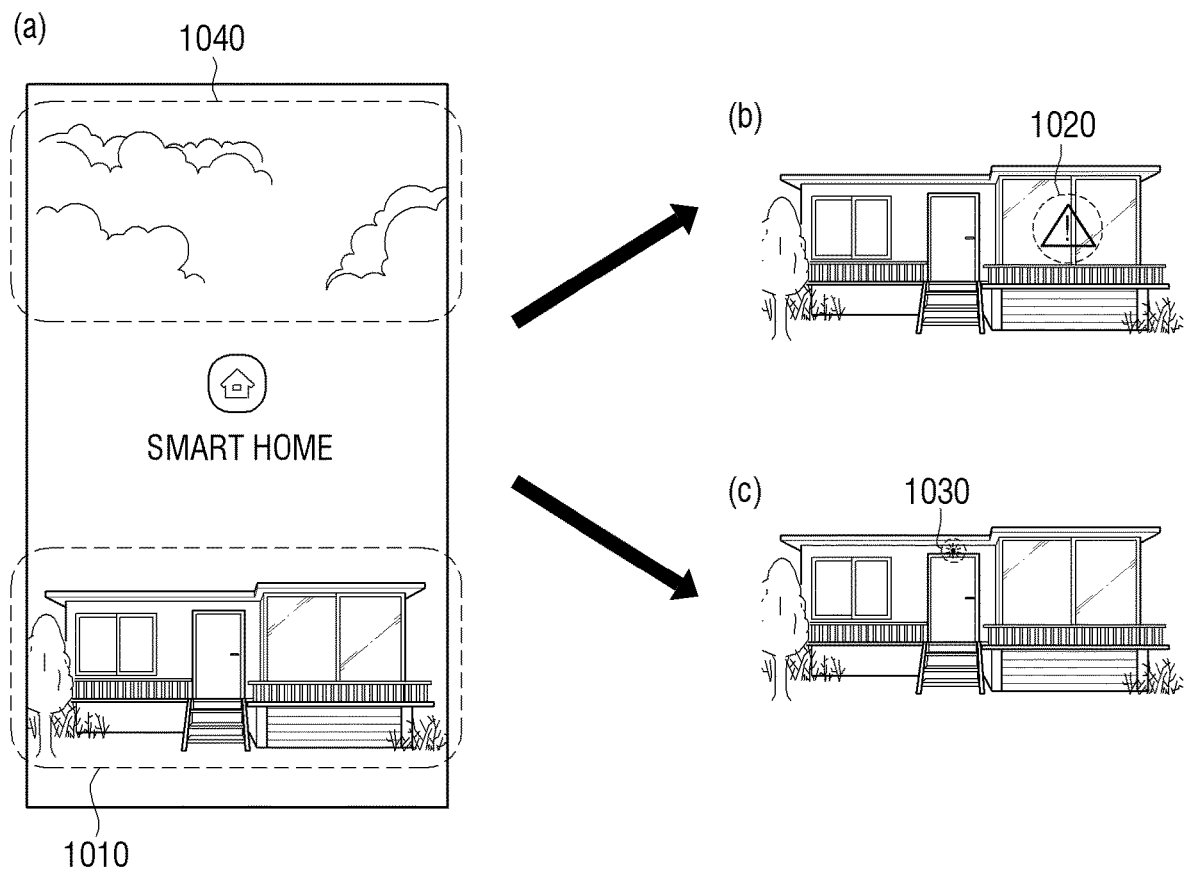
FIG. 10 is views illustrating a method for displaying a control UI on a display apparatus on which a home network service-related application is activated, according to an exemplary embodiment.

FIGS. 10A through 10C are views illustrating a method for monitoring a peripheral status through a peripheral device in a display apparatus activated on a lock screen, according to an exemplary embodiment.

As shown in FIG. 10A, the display apparatus 300 may display a virtual object on a screen in a second execution mode activated on a lock screen. Here, the virtual object may include a home object 1010 indicating a home of a user and a peripheral object 1040 indicating an environment status around the home of the user, according to an exemplary embodiment.

Therefore, the display apparatus 300 may provide a status of the home according to an occurrence of an event through the home object 1010 displayed on the lock screen, based on status information that is corresponding to at least one peripheral device 100 and received through the relay server 400. The display apparatus 300 may also provide the environment status around the home of the user through the peripheral object 1040 based on the status information about the at least one peripheral device 100 or environment information received through a data communication with an external server (not shown).

As shown in FIG. 10B, the display apparatus 300 may parse an occurrence of an event indicating whether the peripheral device 100 installed in the home is behaving abnormally and/or is in operation, based on the received status information about the at least one peripheral device 100. For example, if it is determined that the peripheral device 100 of a smart illumination lamp installed in a living room is currently switched on based on the received status information about the at least one peripheral device 100, the display apparatus 300 displays a device status icon 1020 in an area of the home object 1010.

Therefore, the user may recognize that at least one of the peripheral devices 100 installed in the home is behaving abnormally and/or is in operation, through the device status icon 1020 displayed on the home object 1010 displayed on the lock screen. The user may select the device status icon 1020 displayed on the home object 1010 to recognize a more detailed status. If a selection command, as described above, is input, the display apparatus 300 may display a control UI including detailed information and a control menu of the peripheral device 100 corresponding to the occurrence of the event (the light bulb in the above exemplary embodiment) on a screen displaying the lock screen (not shown).

In detail, if a command to select the device status icon 1020 is input as in the above-described exemplary embodiment, the display apparatus 300 may display a control UI, including detailed information "The illumination lamp in the living room is switched on." and a control menu for controlling switching on and/or off the illumination lamp, on the lock screen. Therefore, the user may determine that the illumination lamp in the living room of the home is switched on and may switch off the illumination lamp by using the control menu included in the control UI.

As shown in FIG. 10C, the display apparatus 300 may parse whether a security-related event occurs, based on the received status information about the at least one peripheral device 100. For example, if it is determined that an event occurrence signal of the peripheral device 100 is generated in a security system installed at a front door based on the received status information about the at least one peripheral device 100, the display apparatus 300 displays a security warning icon 1030 in an area of the home object 1010.

Therefore, the user may recognize that a security problem such as an intrusion has occurred in the home, through the security warning icon 1030 displayed in the home object 1010 displayed on the lock screen, and select the security warning icon 1030 to recognize a detailed status. If the security warning icon 1030 is selected, the display apparatus 300 may generate a security UI as shown in FIGS. 9A through 9C and display an image captured by the at least one peripheral device 100 through the generated security UI.

Therefore, the user may monitor an indoor security status in real time using the image displayed through the security UI of the display apparatus 300.

FIGS. 11A through 11C are views illustrating a method for monitoring a peripheral status through a peripheral device in a display apparatus activated on a lock screen, according to another exemplary embodiment.

As shown in FIG. 11A, the display apparatus 300 may display a home object 1110 indicating a home of a user on a screen in a second execution mode activated on a lock screen.

When the home object 1110 is displayed on the lock screen, as shown in FIG. 11B, the user may select an area 1020 of the home object 1110 to check who stays in the home and perform a dragging operation in a preset direction based on the selected area 1020.

If a touch command of the user is input, the display apparatus 300 determines that the touch command is a command to request an indoor family member status, and generates and displays a family monitoring UI 1030 for showing a family member status in the home based on received status information about at least one peripheral device 100, as shown in FIG. 11C.

In detail, the status information that is about the at least one peripheral device 100 and received from the relay server 400 may include status information about home devices such as the four peripheral devices 100-1 through 100-4 and status information about a peripheral display apparatus (not shown) existing on the same network as the terminal apparatus 200. The status information about the peripheral display apparatus existing on the same network as the terminal apparatus 200 may include at least one of user information and device information of the peripheral display apparatus.

Therefore, if a user command to request the family status is input, the display apparatus 300 may acquire the user information and the device information of the peripheral display apparatus based on the status information about the peripheral display apparatus, from among the received status information. If the user information and the device information are acquired, the display apparatus 300 extracts user face images corresponding to the acquired user information and displays the extracted user face images on family list information 1040 of the family monitoring UI 1030. Therefore, as shown in FIG. 11C, the display apparatus 300 may display the family monitoring UI 1030, including the family list information 1040 providing user face images corresponding to family members staying in the home, on the lock screen. Therefore, the user may check who stays in the home, through the family list information 1040 of the family monitoring UI 1030 displayed on the lock screen of the display apparatus 300.

As shown in FIG. 11C, the user may select a first family member 1050 of family members provided through the family list information 1040. If such a selection command is input, the display apparatus 300 initiates a call to a display apparatus (not shown) of the first family member 1050 corresponding to the input selection command based on stored contact information. Therefore, the user may call family members through the family list information 1040 without being additionally well-acquainted with or inputting the contact information that belongs to the family members.

Figure 12:
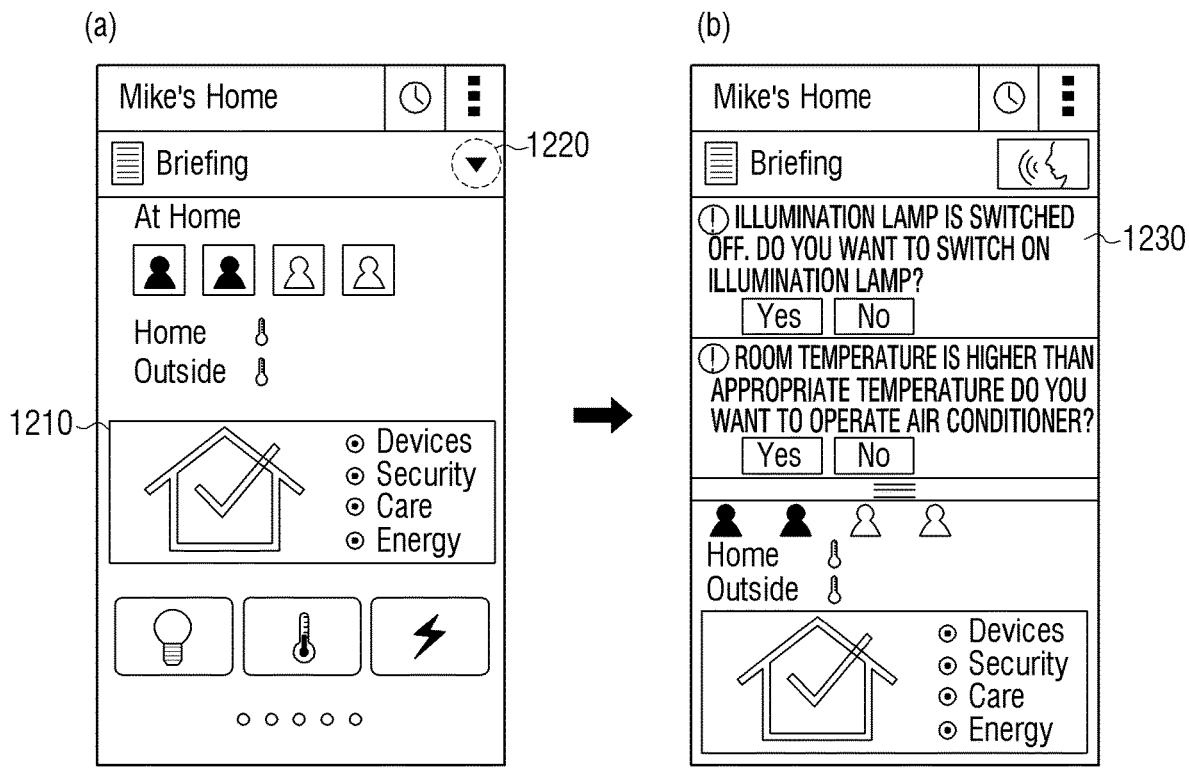
FIG. 12 is views illustrating a method for displaying a control UI on a display apparatus on which a home network service-related application is activated, according to an exemplary embodiment.

FIGS. 12A and 12B are views illustrating a method for displaying a control UI in a display apparatus in which a home network service-related application is activated, according to an exemplary embodiment.

As shown in FIG. 12A, the display apparatus 300 may execute a home network-related application 1210 according to a request of the user. If the home network-related application 1210 is executed, the display apparatus 300 may generate and display a control UI 1230 including status-related detailed information and a control menu of the corresponding peripheral device 100 based on status information that is about at least one peripheral device 100 and received through the terminal apparatus 200 or the relay server 400, regardless of whether a communication with the terminal apparatus 200 is possible.

Here, the peripheral devices 100 may include home devices such as the four peripheral devices 100-1 through 100-4 and a peripheral display apparatus (not shown) existing on the same network as the terminal apparatus 200. In this case, status information about the peripheral display apparatus, existing on the same network as the terminal apparatus 200, may include at least one of user information and device information of the peripheral display apparatus (not shown).

Therefore, if the home network service-related application 1210 is executed as shown in FIG. 10A, the display apparatus 300 may provide a briefing menu 1220, which is to show user information of a user staying in the home and a current status of the peripheral device 100 corresponding to dynamic elements, from among the four peripheral devices 100-1 through 100-4, through the home network service-related application 1010. Here, the dynamic elements may include an illumination intensity, a temperature, and TV editing information, and the peripheral devices 100 performing operations of the dynamic elements may be a smart illumination lamp, an air conditioner, and a smart TV, according to an exemplary embodiment.

If the briefing menu 1220 is selected by the user when the home network service-related application 1010 is executed, the display apparatus 300 may display a control UI 1230 including status-related detailed information about the peripheral device 100 corresponding to the dynamic elements and a control menu for controlling the corresponding peripheral device 100, based on the received status information. Here, the control menu displayed in the control UI 1230 may be a menu for controlling a basic operation of each peripheral device 100 (for example, an operation of switching on and/or off each peripheral device 100, an operation of recording a program, or the like). The status-related detailed information may be detailed result information that is parsed based on status information about the peripheral device 100 corresponding to the dynamic elements.

In detail, if a command to select the briefing menu 1220 is input, the display apparatus 300 may display the control UI 1230 including detailed result information, which is parsed based on status information about the smart illumination lamp, the air conditioner, and the smart TV corresponding to the dynamic elements, and a control menu for controlling operations of the smart illumination lamp, the air conditioner, and the smart TV, according to an exemplary embodiment.

In other words, as shown in FIG. 12B, the display apparatus 300 may display the control UI 1230 including detailed result information "The smart illumination lamp is switched off. Do you want to switch on the smart illumination lamp?" and a control menu for switching on and/or off the smart illumination lamp in relation to the smart illumination lamp, and detailed result information "The room temperature is higher than an appropriate temperature. Do yon want to switch on the air conditioner?" and a control menu for operating the air conditioner in relation to the air conditioner.

Therefore, the user may control the corresponding peripheral device 100 by using a control menu corresponding to the peripheral device 100 that is to be controlled, using the detailed result information about the peripheral device 100 corresponding to the dynamic elements.

Figure 13:
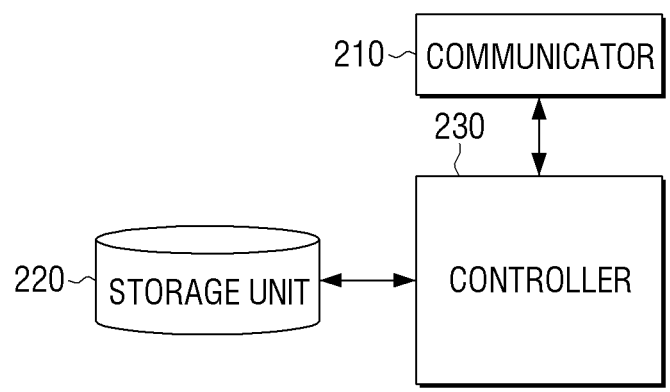
FIG. 13 is a block diagram of a terminal apparatus according to an exemplary embodiment.

FIG. 13 is a block diagram of the terminal apparatus 200, according to an exemplary embodiment.

Referring to FIG. 13, the terminal apparatus 200 includes a communicator 210, a storage unit 220, and a controller 230.

The communicator 210 periodically communicates with registered at least one peripheral device 100 via a wired connection or wirelessly to receive status information from the at least one peripheral device 100. The communicator 210 also communicates with the display apparatus 300 or the relay server 400. Here, the status information may include at least one of activation information including at least one of on/off information, setting information, and sensing information of the peripheral device 100 and communication status information between the peripheral device 100 and the terminal apparatus 200, according to an exemplary embodiment.

The storage unit 220 stores the status information of the at least one peripheral device 100 received through the communicator 210. The storage unit 220 may further include identification information of the display apparatus 300 existing on the same network, identification information of the relay server, etc.

If a status information request message of the peripheral device 100 is received from the display apparatus 300, the controller 230 controls the communicator 210 to transmit status information about a controllable peripheral device 100 or status information about a peripheral device 100 that may be monitored, to the display apparatus 300 based on the status information of the at least one peripheral device 100 stored in the storage unit 220 according to whether a communication with the display apparatus 300 is possible.

In detail, if the communication with the display apparatus 300 is possible (i.e., the terminal apparatus 200 exists on the same network as the display apparatus 300), the controller 230 transmits the status information about the controllable peripheral device 100 to the display apparatus 300 based on the status information of the at least one peripheral device 100 stored in the storage unit 220. If a control command is received from the display apparatus 300 that receives the status information about the controllable peripheral device 100, the controller 230 transmits the received control command to the corresponding peripheral device 100. Therefore, the corresponding peripheral device 100 may perform an operation based on the received control command.

If the communication with the display apparatus 300 is impossible (i.e., the terminal apparatus 200 exists on a different network from the display apparatus 300 and thus receives the status information request message from the display apparatus 300 through the relay server 400), the controller 230 transmits the status information about the peripheral device 100 that may be monitored, to the display apparatus 300 through the relay server 400 based on the status information of the at least one peripheral device 100 stored in the storage unit 220.

If a monitoring performance command is received from the display apparatus 300 through the relay server 400, the controller 230 transmits the monitoring performance command to the corresponding peripheral device 100. The peripheral device 100 that receives the monitoring performance command captures an image of a peripheral space according to the monitoring performance command and transmits captured image information to the terminal apparatus 200. Thereafter, the controller 230 may transmit the image information received from the peripheral device 100 to the display apparatus 300 through the relay server 400.

If a direct data communication with the display apparatus 300 is possible as described above, the terminal apparatus 200 transmits the status information about the controllable peripheral device 100 to the display apparatus 300 based on the stored status information about the at least one peripheral device 100. Therefore, the display apparatus 300 may generate and display a control UI for controlling the peripheral device 100 based on the received status information, and the user may control the peripheral device 100 installed in the home through the control UI displayed on the display apparatus 300.

If an indirect data communication with the display apparatus 300 is possible through the relay server 400, the terminal apparatus 200 transmits the status information about the peripheral device 100 that may be monitored, to the display apparatus 300 based on the stored status information about the at least one peripheral device 100. Therefore, the display apparatus 300 may generate a security UI for monitoring a peripheral space based on the received status information and display an image, which is captured by the peripheral device 100, as requested by the user, through the generated security UI. As a result, the user may monitor the image captured by the peripheral device 100 selected by the user through the security UI displayed on a screen of the display apparatus 300 to check in real time whether risk elements are detected in the home.

A method of controlling operations of the display apparatus 300 and the terminal apparatus 200 will now be described in detail.

Figure 14:
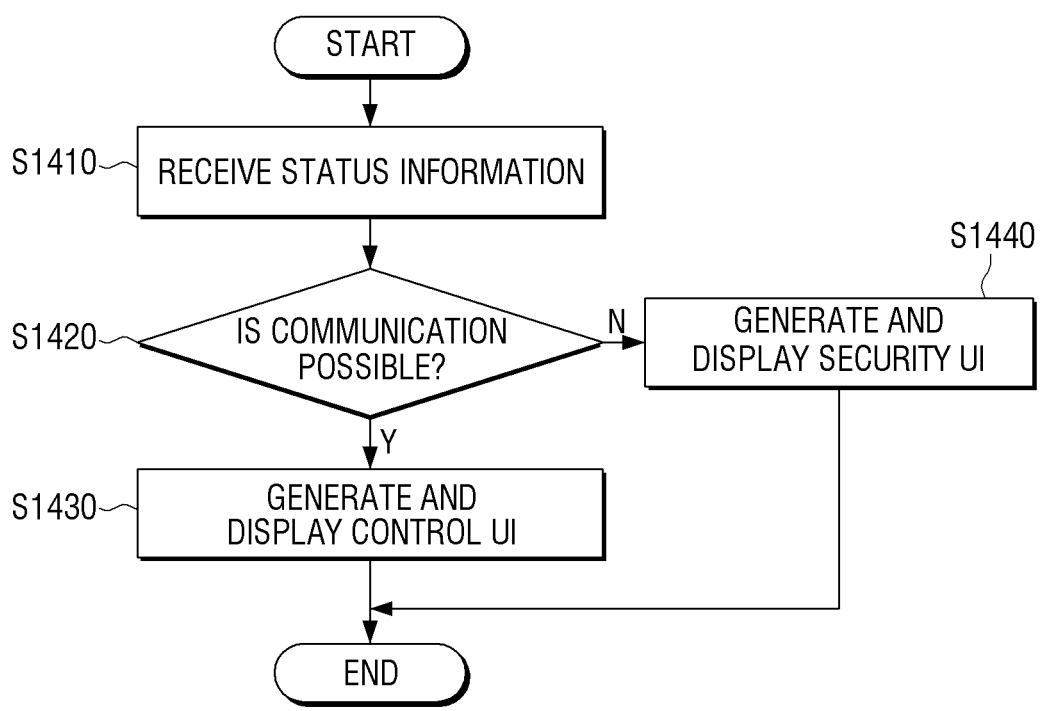
FIG. 14 is a flowchart of a method for controlling a display apparatus, according to an exemplary embodiment.

FIG. 14 is a flowchart of a method for controlling the display apparatus 300, according to an exemplary embodiment.

Referring to FIG. 14, in operation S1410, the display apparatus 300 communicates with the terminal apparatus 200 or the relay server 400 to receive collected status information about at least one peripheral device 100 from the terminal apparatus 200. Here, the status information may include at least one of activation information including at least one of on/off information, setting information, sensing information of the peripheral device 100 and communication status information between the peripheral device 100 and the terminal apparatus 200, according to an exemplary embodiment.

If the status information about the at least one peripheral device 100 is received in operation S1410, the display apparatus 300 determines whether a communication with the terminal apparatus 200 is possible in operation S1420. In detail, if a direct data communication with the terminal apparatus 200 is not possible through a short-range wireless communication, the display apparatus 300 determines whether an indirect data communication with the terminal apparatus 200 is possible through the relay server 400.

If it is determined in operation S1420 that the direct data communication with the terminal apparatus 200 is possible through the short-range wireless communication, the display apparatus 300 generates and displays a control UI for controlling the at least one peripheral device 100 based on the received status information about the at least one peripheral device 100 in operation S1430.

If it is determined in operation S1420 that indirect data communication with the terminal apparatus 200 is possible through the relay server 400, the display apparatus 300 generates and displays a security UI for monitoring a peripheral space through the at least one peripheral device 100 based on the received status information about the at least one peripheral device 100 in operation S1440.

A method of generating a control UI for controlling at least one peripheral device 100 or a security UI for monitoring a peripheral space through the at least one peripheral device 100 according to a communication status between the display apparatus 300 and the terminal apparatus 200 will now be described in detail.

Figure 15:
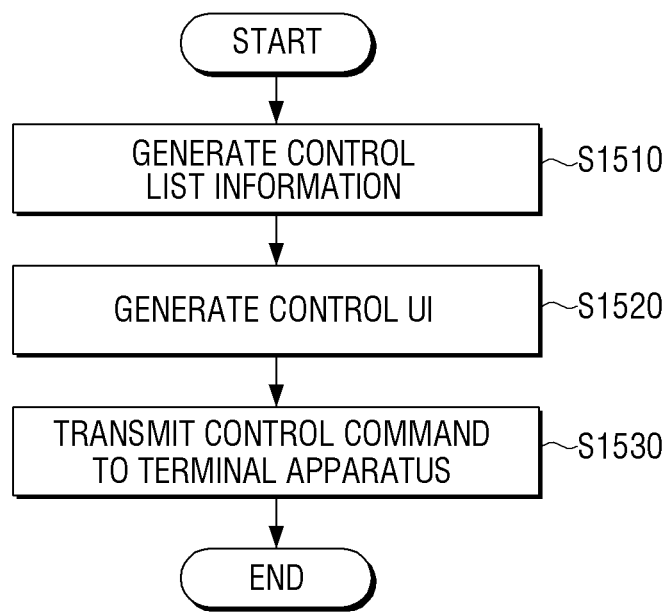
FIG. 15 is a flowchart of a method for generating a control UI for controlling a peripheral device on a display apparatus, according to an exemplary embodiment.

FIG. 15 is a flowchart of a method for generating a control UI for controlling a peripheral device in a display apparatus, according to an exemplary embodiment.

Referring to FIG. 15, if it is determined that a direct data communication with the terminal apparatus 200 is possible through a short-range wireless communication, the display apparatus 300 generates and displays control list information about a controllable peripheral device 100, based on received status information about at least one peripheral device 100, in operation S1510. If a command to select at least one peripheral device 100 is input from a user when the control list information is displayed, the display apparatus 300 generates and displays a control UI including a control menu for controlling the peripheral device 100, corresponding to the input command, in operation S1520. Here, the control list information may be list information including device information about at least one controllable peripheral device 100.

Therefore, if a command to select the controllable peripheral device 100 is input when the control list information including the device information about the at least one peripheral device 100 is displayed, the display apparatus 300 may generate and display the control UI including a control menu for controlling the peripheral device 100 corresponding to the input command, from among stored control commands of respective peripheral devices 100.

The display apparatus 300 that generates and displays the control UI for controlling the selected peripheral device 100 as described above may differently generate the control list information according to an execution mode. Here, the execution mode may include at least one of a first execution mode activated on a quick menu, a second execution mode activated on a lock screen, and a third execution mode in which a home network service-related application is activated. However, the execution modes are not limited thereto.

In the first execution mode activated on the quick menu, the display apparatus 300 may generate and display first control list information including all controllable peripheral devices 100 based on received status information. In the second execution mode activated on the lock screen, the display apparatus 300 may generate and display second control list information including an activated peripheral device 100, from among all controllable peripheral devices 100. In the third execution mode in which the home network service-related application is activated, the display apparatus 300 may generate and display a control UI including status-related detailed information and a control menu of at least one peripheral device 100 based on received status information regardless of whether a communication with the terminal apparatus 200 is possible.

As described above, the display apparatus 300 may differently generate and display the control list information and the control UI according to an execution mode that is currently executed.

If a command to select at least one control menu is input when a control UI including a plurality of control menus is displayed, the display apparatus 300 transmits a control command related to a control menu, corresponding to the input command, to the terminal apparatus 200, in operation S1530. Thereafter, the terminal apparatus 200 transmits the control command to the peripheral device 100 selected by the user based on the control command received from the display apparatus 300. As a result, the peripheral device 100 that receives the control command from the terminal apparatus 200 may perform a control operation based on the received control command.

Figure 16:
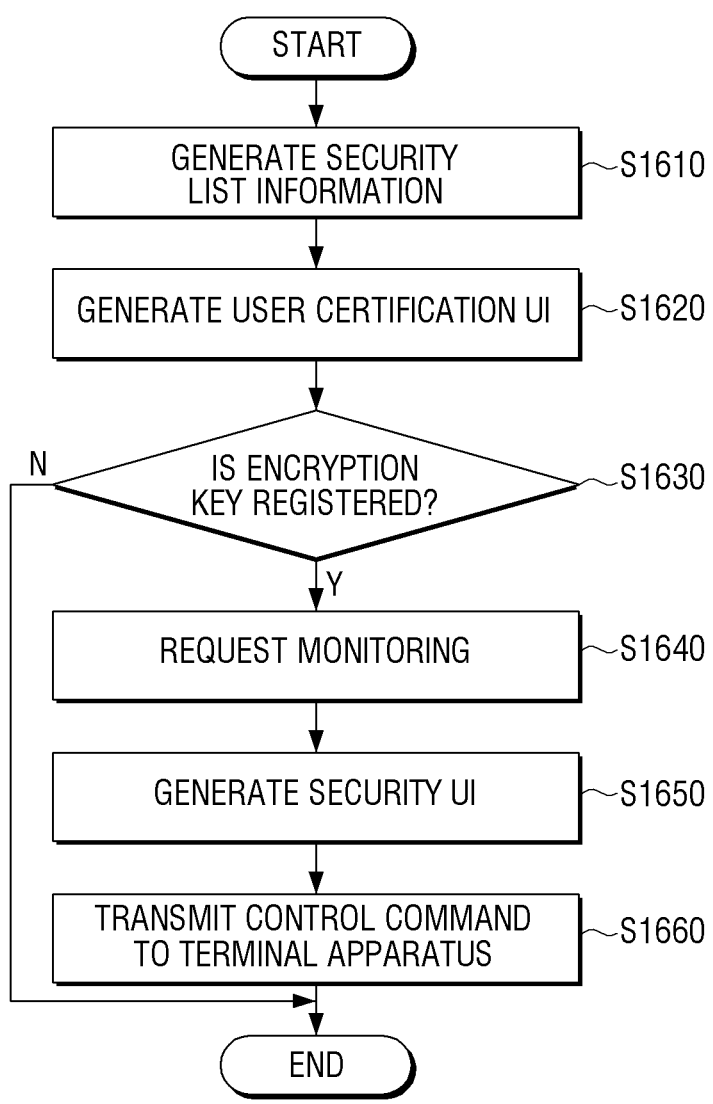
FIG. 16 is a flowchart of a method for generating a security UI for monitoring a peripheral device on a display apparatus, according to an exemplary embodiment.

FIG. 16 is a flowchart of a method for generating a security UI for monitoring a peripheral device in a display apparatus, according to an exemplary embodiment.

Referring to FIG. 16, if it is determined that an indirect communication with the terminal apparatus 200 is possible through the relay server 400, the display apparatus 300 generates and displays security list information about a peripheral device 100 that may be monitored, based on received status information about the peripheral device 100 and setting information of each registered peripheral device 100 in operation S1610. Here, the security list information may include identification information indicating the peripheral device 100 that may monitor a peripheral space/may be monitored in a peripheral space by a security device and area information showing an area that may be monitored through the corresponding peripheral device 100.

If a command to select the peripheral device 100 that may monitor the peripheral space is input when the control list information is displayed, the display apparatus 300 generates and displays a user certification UI for certifying a user in operation S1620.

If an encryption key is input when the user certification UI is displayed, the display apparatus 300 determines whether the input encryption key corresponds to a preset encryption information in operation S1630. If it is determined in operation S1630 that the encryption key corresponds to the preset encryption information, the display apparatus 300 requests the terminal apparatus 200, through the relay server 400, to monitor the peripheral device 100 corresponding to the input selection command in operation S1640. The terminal apparatus 200 transmits a monitoring performance command to the peripheral device 100 that is requested to be monitored, according to the monitoring request and, if captured image information of the peripheral space is received from the corresponding peripheral device 100, transmits the received image information to the display apparatus 300 through the relay server 400.

If the image information is received, the display apparatus 300 generates a security UI for displaying an image captured by the peripheral device 100 and displays an image corresponding to the received image information in an area of the generated security UI in operation S1650.

Therefore, the user may monitor, in real time, the peripheral space related to the peripheral device 100 selected by the user through the image displayed in the area of the security UI displayed on a screen of the display apparatus 300.

The display apparatus 300 may generate and display a security UI including a monitoring control menu for controlling a monitoring operation of the peripheral device 100 that is requested to be monitored. Also, the display apparatus 300 may generate and display a security UI further including an editing menu for editing the image captured by the peripheral device 100, that is requested to be monitored.

Here, the monitoring control menu, for example, may include at least one of a menu for switching on and/or off the peripheral device 100 that performs monitoring and a menu for controlling a monitoring direction of the corresponding peripheral device 100, according to an exemplary embodiment. Also, the editing menu may include at least one of a menu for capturing or recording the image captured by the peripheral device 100, that is requested to be monitored, and a menu for stopping a currently displayed security UI. Therefore, if a command to select the monitoring control menu is input using the security UI, the display apparatus 300 transmits a control command corresponding to the input command to the terminal apparatus 200, through the relay server 400, in operation S1660. Thereafter, the terminal apparatus 300 may transmit the corresponding control command to the peripheral device 100 that transmits the captured image, and the peripheral device 100 that receives the control command may perform a control operation based on the received control command.

Therefore, the user may monitor, in real time, a status of the home through the image displayed in the area of the security UI displayed on the screen of the display apparatus 300, and control a capturing operation of the peripheral device 100 or edit the image captured by the corresponding peripheral device 100 through the monitoring control menu or the editing menu incorporated in the security UI.

Figure 17:
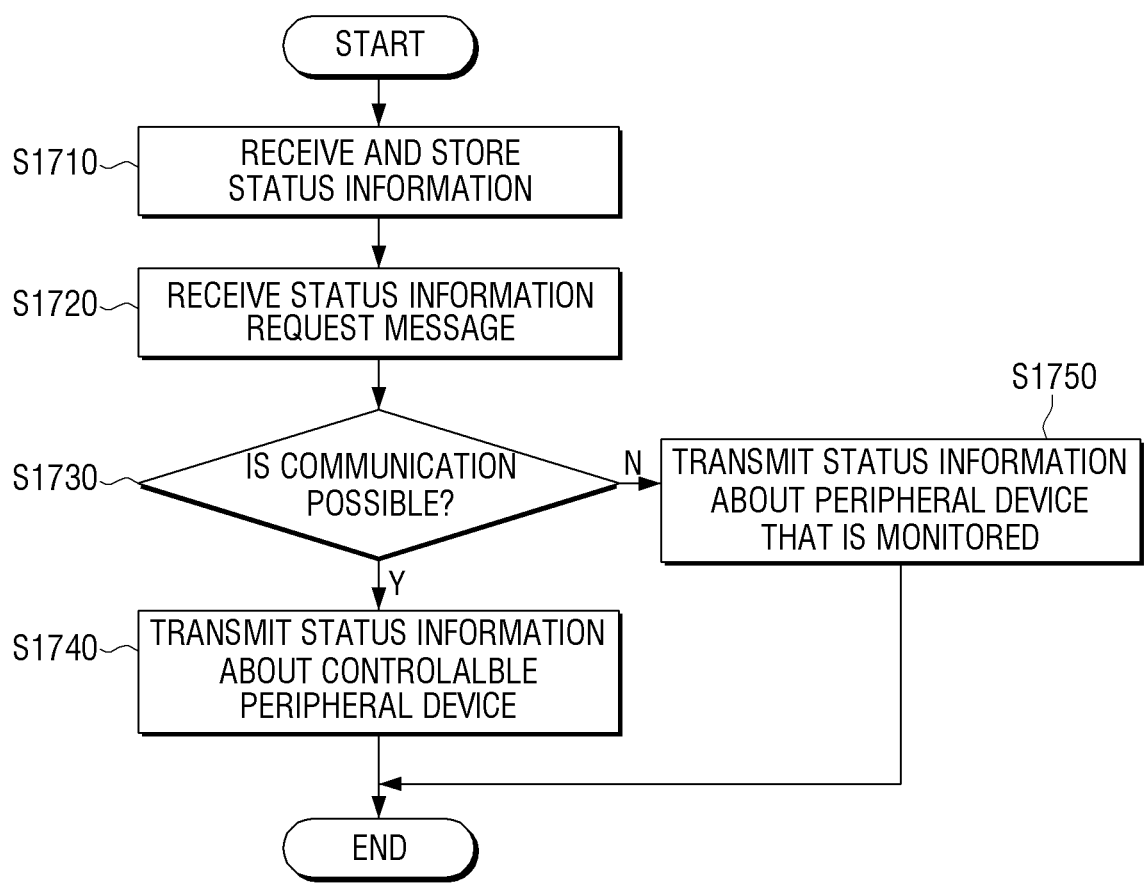
FIG. 17 is a flowchart of a method for controlling a terminal apparatus, according to an exemplary embodiment.

FIG. 17 is a flowchart of a method for controlling the terminal apparatus 200, according to an exemplary embodiment.

Referring to FIG. 17, the terminal apparatus 200 periodically communicates with the registered at least one peripheral device 100 to receive and store status information about the at least one peripheral device 100 in operation S1710. Here, the status information may include at least one of activation information including at least one of on/off information, setting information, sensing information of the peripheral device 100 and communication status information between the peripheral device 100 and the terminal apparatus 200, according to an exemplary embodiment.

If a status information request message requesting the status information of the peripheral device 100 is received from the display apparatus 300, the terminal apparatus 200 determines whether a communication with the display apparatus 300 is possible in operations S1720 and S1730.

In detail, if the status information request message is received from the display apparatus 300, the terminal apparatus 200 may determine that the terminal apparatus 200 exists on a network on which the terminal apparatus 200 directly communicates with the display apparatus 300 (i.e., the terminal apparatus 200 exists on the same network as the display apparatus 200). If it is determined that the status information request message is received from the display apparatus 300 through the relay server 400, the terminal apparatus 200 may determine that the terminal apparatus 200 indirectly communicates with the display apparatus 300 (i.e., the terminal apparatus 200 exists on a different network from the display apparatus 300).

If it is determined that the status information request message is received through a direct communication with the display apparatus 300 as described above, the terminal apparatus 200 transmits status information about a controllable peripheral device 100 to the display apparatus 300, based on stored status information about the at least one peripheral device 100, in operation S1740.

If a control command is received from the display apparatus 300, the terminal apparatus 200 transmits the received control command to the peripheral device 100 corresponding to the received control command. Therefore, the peripheral device 100 may perform an operation based on the received control command.

If it is determined that the status information request message is received from the display apparatus 300 through the relay server 400, the terminal apparatus 200 transmits status information about the peripheral device 100 that may be monitored, to the display apparatus 300 through the relay server 400, based on the stored status information about the at least one peripheral device 100, in operation S1750.

If a monitoring performance command is received through the relay server 400, the terminal apparatus 200 transmits the monitoring performance command to the peripheral device 100 corresponding to the received monitoring performance command. The peripheral device 100 that receives the monitoring performance command captures an image of a peripheral space according to the received monitoring performance command and transmits the captured image information to the terminal apparatus 200. If the image information is received, the terminal apparatus 200 may transmit the image information regarding the image captured by the peripheral device 100 to the display apparatus 300 through the relay server 400.

Therefore, the user may monitor the image captured by the peripheral device 100 selected by the user through the security UI, displayed on the screen of the display apparatus 300, to check in real time whether risk elements are detected in the home.

According to various exemplary embodiments described above, a display apparatus may control a home device that is a peripheral device according to a communication status with a terminal apparatus or monitor an environment status of a home through an image captured by the home device in real time.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a communicator;
a display; and
a processor configured to:
based on receiving, from at least one peripheral device, status information related to the at least one peripheral device while the display apparatus is in a lock state, identify whether the display apparatus communicated with the at least one peripheral device via a direct connection through the same network into which the display apparatus and the at least one peripheral device are connected or by an indirect connection through a relay apparatus which communicates with the display apparatus via a first network connection and with the at least one peripheral device via a second network connection different from the first network connection when the display apparatus and the at least one peripheral device are not connected into the same network,
based on the identifying that the display apparatus communicated with the at least one peripheral device through the same network, control the display to display a first lock screen including a first user interface (UI) including a menu item for controlling the at least one peripheral device, and control the at least one peripheral device to perform an operation or adjust a setting based on a user control input received through the menu item, and based on the identifying that the display apparatus communicated with the at least one peripheral device by the indirect connection through the relay apparatus, control the display to display a second lock screen including a second UI different from the first UI, wherein the second lock screen does not include the first UI.

2. The display apparatus of claim 1, wherein the processor is further configured to:
based on the identifying that the display apparatus communicated with the at least one peripheral device through the same network, control the display to display a third UI including the status information corresponding to the at least one peripheral device on the lock screen.

3. The display apparatus of claim 1, wherein the status information includes at least one of activation information of the at least one peripheral device that includes at least one from among on/off information, setting information, and sensing information, or communication status information between the at least one peripheral device and the display apparatus.

4. The display apparatus of claim 1, wherein the processor is further configured to:
based on executing an application for controlling the at least one peripheral device according to a request of a user, control the display to display an execution screen of the application including the first UI based on the status information.

5. The display apparatus of claim 1, wherein the at least one peripheral device communicates with a home gateway, and
the processor is further configured to receive the status information from the at least one peripheral device via the home gateway.

6. A method of controlling a display apparatus, the method comprising:
receiving, from at least one peripheral device, status information related to the at least one peripheral device while the display apparatus is in a lock state;
based on the receiving the status information, identifying whether the display apparatus communicated with the at least one peripheral device via a direct connection through the same network into which the display apparatus and the at least one peripheral device are connected or by an indirect connection through a relay apparatus which communicates with the display apparatus via a first network connection and with the at least one peripheral device via a second network connection different from the first network connection when the display apparatus and the at least one peripheral device are not connected into the same network; and
based on the identifying that the display apparatus communicated with the at least one peripheral device through the same network, displaying on the display apparatus a first lock screen including a first user interface (UI) including a menu item for controlling the at least one peripheral device and controlling the at least one peripheral device to perform an operation or adjust a setting based on a user control input received through the menu item, and
based on the identifying that the display apparatus communicated with the at least one peripheral device by the indirect connection through the relay apparatus, displaying on the display apparatus a second lock screen including a second UI different from the first UI, wherein the second lock screen does not include the first UI.

7. The method of claim 6, further comprising:
based on the identifying that the at least one peripheral device communicated through the same network, displaying a third UI including the status information corresponding to the at least one peripheral device on the lock screen.

8. The method of claim 6, wherein the status information includes at least one of activation information of the at least one peripheral device that includes at least one from among on/off information, setting information, and sensing information, or communication status information between the at least one peripheral device and the display apparatus.

9. The method of claim 6, further comprising:
based on executing an application for controlling the at least one peripheral device according to a request of a user, displaying an execution screen of the application including the first UI based on the status information.

10. The method of claim 6, wherein the at least one peripheral device communicates with a home gateway, and
the receiving comprises receiving the status information from the at least one peripheral device via the home gateway.

11. The display apparatus of claim 1, wherein the second UI is used to perform a user certification.

12. The display apparatus of claim 1, wherein the second UI is used to perform security monitoring of the at least one peripheral device.

* * * * *